(12) United States Patent
Ishibashi et al.

(10) Patent No.: US 7,177,899 B2
(45) Date of Patent: Feb. 13, 2007

(54) FRAMEWORK SYSTEM

(75) Inventors: Kunihito Ishibashi, Tokyo (JP); Mitsuru Maeshima, Tokyo (JP); Narihiro Okumura, Tokyo (JP); Isao Sakashita, Tokyo (JP); Yoko Igakura, Tokyo (JP)

(73) Assignee: Future System Consulting Corp., Tokyo (JP)

( * ) Notice: Subject to any disclaimer, the term of this patent is extended or adjusted under 35 U.S.C. 154(b) by 887 days.

(21) Appl. No.: 10/204,740

(22) PCT Filed: Dec. 27, 2001

(86) PCT No.: PCT/JP01/11532

§ 371 (c)(1),
(2), (4) Date: Aug. 21, 2002

(87) PCT Pub. No.: WO02/054263

PCT Pub. Date: Jul. 11, 2002

(65) Prior Publication Data

US 2003/0014551 A1    Jan. 16, 2003

(30) Foreign Application Priority Data

Dec. 28, 2000    (JP)    ............................. 2000-401794

(51) Int. Cl.
*G06F 15/16*    (2006.01)
(52) U.S. Cl. ..................... 709/201; 709/227; 370/352
(58) Field of Classification Search ................ 709/201, 709/227; 370/352
See application file for complete search history.

(56) References Cited

U.S. PATENT DOCUMENTS

| | | |
|---|---|---|
| 5,634,127 A | 5/1997 | Cloud et al. |
| 5,768,506 A | 6/1998 | Randell |
| 5,960,404 A | 9/1999 | Chaar et al. |

FOREIGN PATENT DOCUMENTS

EP    1024429    11/1999

(Continued)

OTHER PUBLICATIONS

Shinichi Morisoba, "Application Kan Renkei o Jidoka suru EAI Tool", No. 80, Nikkei Business Publications, Inc., Nov. 15, 1999, pp. 123-127.

(Continued)

*Primary Examiner*—William Vaughn
*Assistant Examiner*—Thanh (Tammy) Nguyen
(74) *Attorney, Agent, or Firm*—David N. Lathrop, Esq.; Gallagher & Lathrop

(57) ABSTRACT

Disclosed is a framework system improved such that flow of complex business logic for processing a variety of messages may be easily defined and changed without need for programming. Messaging service(s) 15 may relay message(s) between client(s) 11, 13 and framework service(s) 16. Among request message(s) relayed from client(s) 11, 13 to framework service(s) 16 there may be message(s) comprising subject ID(s) associated with subject(s) of such message(s). Framework service(s) 16 may possess a plurality of sets of business logic 22 and flow definition file(s) 23. Flow definition file(s) 23 may comprise a plurality of definition sentences respectively corresponding to various subject IDs, and each such definition sentence may indicate schedule(s) for execution of business logic. Framework service(s) 16, upon receiving request message(s) from messaging service(s) 15, may select one or more sets of business logic for execution in accordance with execution schedule(s) corresponding to subject ID(s) of such message(s) indicated in definition file(s). Flow definition file(s) 23 can be rewritten at desired time or times notwithstanding the fact that framework service(s) 16 may be operational at such time(s). In the event that a plurality of sets of business logic are to be executed in linked fashion, framework service(s) 16 may execute subsequent business logic synchronously and/or asynchronously with respect to first business logic pursuant to execution schedule(s) indicated in definition sentence(s).

12 Claims, 24 Drawing Sheets

FOREIGN PATENT DOCUMENTS

| | | |
|---|---|---|
| JP | 5856171 | 4/1983 |
| JP | 59220866 | 12/1984 |
| JP | 62126457 | 6/1987 |
| JP | 62212763 | 9/1987 |
| JP | 1129345 | 5/1989 |
| JP | 1-253036 | 10/1989 |
| JP | 1253036 | 10/1989 |
| JP | 2109154 | 4/1990 |
| JP | 2113362 | 4/1990 |
| JP | 2275563 | 11/1990 |
| JP | 0385663 | 4/1991 |
| JP | 1115796 | 1/1999 |
| JP | 11120009 | 4/1999 |
| JP | 284980 | 12/1999 |
| JP | 242697 | 9/2000 |
| JP | 250768 | 9/2000 |

OTHER PUBLICATIONS

Akihiko Matsumoto, Tokushu "EAI Solution", Network Computing, vol. 11, No. 8, published by Rikku Telecom, Aug. 1, 1999, pp. 34-47.

"Host Renkei to EAI", Nikkei Computer, No. 511, Nikkei Business Publications, Inc., Dec. 18, 2000, pp. 251-262.

Tomoo Ida, "Business Rule Chushin no Kaihatsu Shuho", Network Computing, vol. 10, No. 9, published by Rikku Telecom, Sep. 1, 1998, pp. 55-67.

Takao Fukuda, "J2EE Taio Web Application Server", Nikkei Internet Technology, No. 41, Nikkei Business Publications, Inc., Nov. 22, 2000 pp. 210-219.

Chappell, David, "Microsoft Message Queue is a Fast, Efficient Choice for your Distributed Application," Jul. 1998.. Microsoft Systems Journal.

| Computer type | Computer ID | IP address | P to P subject ID(s) | P to M subject ID(s) | In-process flag |
|---|---|---|---|---|---|
| F | Frm1 | 10.100.1.1 | A,B,C,D | O,P,Q,R | 1 |
| F | Frm2 | 10.100.1.2 | C,D,E,F | P,Q,R,S | 0 |
| M | Mes2 | 10.100.2 | D,E,F,G,H,I,J | P,Q,R,S,T,U | 0 |
| T | PC1 | 10.1.1.3 | K,L | V,W | 0 |
| T | PC2 | 10.1.1.2 | K,L | V,W | 1 |
| T | PC3 | 10.1.1.3 | M,N | X,Y | 0 |

231 — # input subject ID(s), log queue name(s), executable business logic name(s), message conversion business logic name(s), output subject ID(s), linking mode flag(s);

232 — #BuySelBuy, @NONE, BuySelBuy;

233 — #BuyUpdBuy, @DEF, BuyUpdBuy; CnvBuyUpdBuy, InvUpdInv, SYNC;

234 — #BuyInsBuy, @DEF, BuyInsBuy; CnvBuyInsBuy1, InvUpdInv, ASYNC; CnvBuyInsBuy2, AccDbtBuy, ASYNC;

FRAMEWORK SYSTEM

FIELD OF ART

The present invention pertains to a framework system capable of executing one or more selected sets of business logic responsive to one or more messages from one or more clients.

BACKGROUND OF ART

Such a framework system typically comprises one or more servers connected so as to be capable of communication with one or more clients. Such a framework system has conventionally been provided with the two basic functionalities represented by messaging service functionality and framework service functionality. A messaging service is a service that processes messages communicated between or among client or clients and server or servers, and/or between or among server or servers and server or servers. A framework service possesses one or more but ordinarily a plurality of sets of business logic (business operation process or processes), and performs one or more transactions by synchronously or a synchronously executing one or more selected sets of business logic responsive to one or more messages from one or more clients.

However, in the conventional example described above, schedules for processing of business logic by framework services are defined by fixed programming. This makes it difficult to flexibly define flows of complex business logic to accommodate diverse varieties of messages.

Furthermore, a plurality of sets of business logic may be executed in turn in response to message or messages from client or clients. For example, logging of a purchase, update of inventory, entry into an accounts payable ledger, and the like might be performed in response to a request from a client for logging of a purchase. In such a case, in a conventional system, business logic for logging of purchases and other such front-office-type operations might for example be executed synchronously with respect to the message, with business logic for update of inventory, entry into an accounts payable ledger, and other such back-office-type operations being executed through batch processing carried out at night. This means that it is necessary to wait until the next day before the results of back-office processing will become available. But to be able to promptly take advantage of a prospective transaction it is desirable that back-office business logic be executed as soon as possible so that those results can be made available quickly.

Furthermore, in the case of a system employing a plurality of framework servers, messages may also be sent between and/or among framework servers as they work together to execute a group of sets of business logic. The status or statuses (e.g., the type of business logic stored therein, whether operating normally or not, whether busy or not, etc.) of any particular server will ordinarily be different from the status or statuses of other servers, and will moreover change as time goes on. This complicates scheduling, i.e., the decision of which server or servers to employ for execution of business logic.

DISCLOSURE OF INVENTION

It is an object of the invention to provide a framework system in which flow of business logic is not programmed but is instead easily defined and changed.

It is another object of the present invention to provide a framework system permitting a group of sets of business logic to be executed if not completely in real time at least as close as possible to real time.

It is yet another object of the present invention to, in a system comprising a plurality of framework servers, permit scheduling of a group of sets of business logic to be carried out appropriately in correspondence to status or statuses of those servers.

A framework system in accordance with one aspect of the present invention and connected so as to be capable of communication with one or more clients comprises one or more framework services which is or are associated with a plurality of sets of business logic and which, responsive to one or more request messages from one or more clients, is or are capable of executing one or more selected sets of business logic and outputting one or more reply messages to one or more clients; one or more messaging services interposed between client or clients and framework service or services and capable of relaying one or more messages between client or clients and framework service or services; and one or more flow definition files associated with one or more framework services. One or more request messages may comprise one or more subject IDs identifying one or more subjects of that or those messages. One or more flow definition files may comprise a plurality of definition sentences respectively corresponding to a plurality of different subject IDs, each such definition sentence indicating one or more schedules for execution of one or more prescribed sets of business logic. One or more framework services, upon receiving one or more request messages from one or more messaging services, may reference one or more definition sentences present within one or more definition files and corresponding to one or more subject IDs of one or more received request messages, and select one or more sets of business logic for execution in accordance with one or more execution schedules indicated by one or more referenced definition sentences.

In a preferred embodiment, such a framework system further comprises one or more flow definition update components capable of updating one or more flow definition files while one or more framework services is or are operational.

In a preferred embodiment, one or more flow definition files may comprise one or more flow definition sentences indicating one or more linked execution schedules for linked execution of a plurality of sets of business logic comprising one set of first business logic and one or more sets of subsequent business logic (such flow definition file or files need not, of course, comprise such definition sentence or sentences defining such linked execution schedule or schedules). Such linked execution schedule or schedules may comprise indication of state or states of one or more linking mode flags for selection of synchronous or asynchronous execution of subsequent business logic. In addition, such framework service or services may, in the event of execution of a plurality of sets of business logic in accordance with linked execution schedule or schedules, execute subsequent business logic synchronously or asynchronously with respect to execution of first business logic in accordance with linking mode flag or flags present within linked execution schedule or schedules.

In a preferred embodiment, linked execution schedule or schedules may comprise information concerning first business logic and information concerning one or more secondary request messages for subsequent business logic. In addition, such framework system or systems may, in the event of execution of a plurality of sets of business logic in accordance with linked execution schedule or schedules, execute first business logic, thereafter use the results of execution of first business logic to create secondary request message or messages, and send such secondary request message or messages to messaging service or services. Such framework system or systems may thereafter, upon receipt of such secondary request message or messages from messaging service or services, execute subsequent business logic in accordance with execution schedule or schedules of definition sentence or sentences corresponding to such secondary request message or messages.

In a preferred embodiment, moreover, one or more messaging services may be equipped with one or more nonvolatile message queues capable of protected storage of such secondary request message or messages. Such message queue or queues may be capable of preventing deletion of secondary request message or messages by continuing to store secondary request message or messages after such secondary request message or messages has or have been sent to framework service or services. In addition, such messaging service or services may be capable of resending secondary request message or messages stored in such nonvolatile message queue or queues to such a framework system as necessary.

A framework system in accordance with another aspect of the present invention and connected so as to be capable of communication with one or more clients comprises one or more framework services capable of processing one or more request messages from one or more clients and outputting one or more reply messages to one or more clients; and one or more messaging services interposed between client or clients and framework service or services and capable of relaying one or more messages between client or clients and framework service or services. In addition, such messaging service or services may be capable of relaying not only one or more P to P messages such as such request and/or reply message or messages, but also of relaying one or more P to M messages between client or clients and framework service or services.

In a preferred embodiment, such messaging service or services may have one or more ring buffers capable of temporarily delaying one or more P to M messages.

In a preferred embodiment, moreover, P to P messages may respectively comprise indication of state or states of one or more protected mode flags indicating whether protected storage is required. In addition, such messaging service or services may have one or more primary message queues capable of temporarily delaying one or more P to P messages for which protected storage is not required and one or more nonvolatile secondary message queues capable of temporarily delaying one or more P to P messages for which protected storage is required.

A framework system in accordance with yet another aspect of the present invention and connected so as to be capable of communication with one or more clients comprises a plurality of messaging services mutually connected in mesh fashion and comprising at least one messaging service which is connected to one or more clients; and a plurality of framework services respectively connected to a plurality of messaging services. In addition, a plurality of framework services may be respectively capable of awaiting one or more request messages having one or more preestablished subject IDs and, upon receipt of one or more request messages having such preestablished subject ID or IDs, of processing the received request message or messages and of outputting one or more reply messages to one or more clients. In addition, such plurality of messaging services may be capable of relaying one or more messages between client or clients and such plurality of framework services and may be capable of relaying one or more messages between or among such plurality of framework systems.

In a preferred embodiment, messaging service or services may be respectively capable of monitoring operation of one or more other messaging services, and, in the event that normal operation of at least one other messaging service fails to be detected, one or more messages may be relayed to one or more other messaging services which is or are operating normally instead of to such messaging service or services which is or are not operating normally.

In a preferred embodiment, moreover, messaging service or services may be respectively capable of monitoring state or states of one or more framework services respectively connected thereto, and selection of whether to relay one or more request messages from client or clients to such framework service or services or to one or more other messaging services may be made in correspondence to monitored state or states.

In a preferred embodiment, moreover, messaging service or services may have their own respective management table or tables, one or more subject IDs of one or more messages awaited by one or more framework systems connected to messaging service or services and one or more subject IDs of one or more messages respectively awaited by one or more other messaging services connected to messaging service or services may be registered in such management table or tables. In addition, messaging service or services, at one or more times when one or more messages is or are received, may reference management table or tables respective thereto, search for one or more framework services or one or more other messaging services that awaits or await subject ID or IDs matching subject ID or IDs of received message or messages, and relay received message or messages to framework service or services or other messaging service or services found as a result of search.

In a preferred embodiment, furthermore, messaging service or services may communicate, to one or more other messaging services, subject ID or IDs of message or messages awaited by such messaging service or services based on content of management table or tables respective thereto. Other messaging service or services, upon receipt of such communication, may respectively additionally register communicated content in management table or tables respective thereto if such communicated content is not yet registered in management table or tables respective thereto.

A framework system in accordance with still another aspect of the present invention and connected so as to be capable of communication with one or more clients comprises one or more framework services capable of processing one or more request messages from client or clients and of outputting one or more reply messages to client or clients, and one or more messaging services interposed between client or clients and framework service or services and capable of relaying one or more messages between client or clients and framework service or services. Request message or messages from client or clients may be prioritized in a particular fashion. In addition, messaging service or services may comprise one or more message queues capable of temporarily delaying such request message or messages and one or more queue management components capable of managing input and/or output of message queue or queues. Queue management component or components may be provided with a prioritized mode by which, at one or more times when a plurality of messages have been stored in message queue or queues, order or orders in which a plurality of messages are output from message queue or queues is or are controlled in correspondence to respective priority or priorities of respective message or messages, and with a sequence protection mode by which, at one or more times when a plurality of messages have been stored in message queue or queues, retrieval of other messages stored in message queue or queues is prohibited until completion of processing at such framework service or services of message or messages previously retrieved from message queue or queues.

BRIEF DESCRIPTION OF DRAWINGS

FIG. 13 shows a simple example of a flow definition file.

BEST MODE OF CARRYING OUT INVENTION

Figure 1:
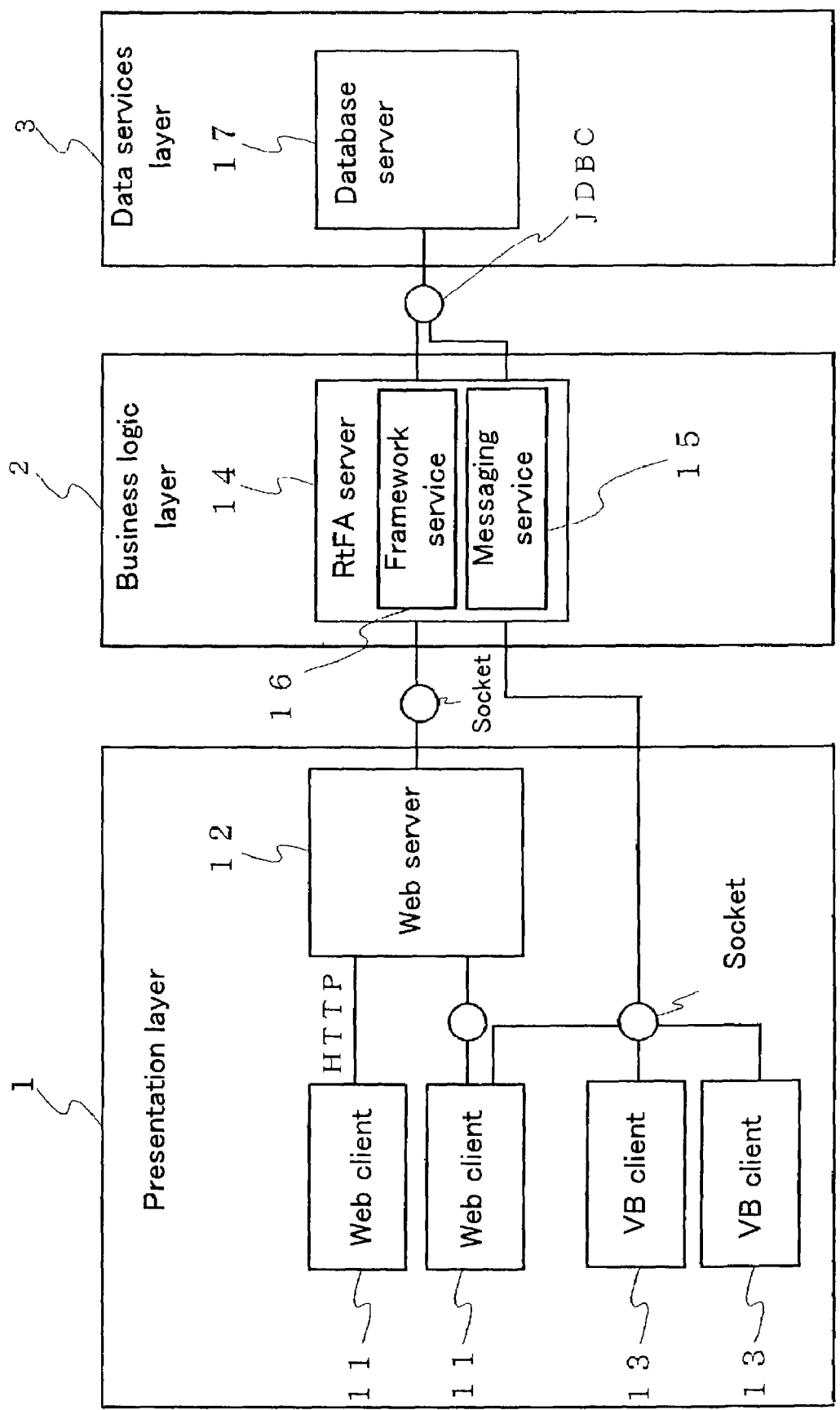
FIG. 1 is a drawing of the overall constitution of the present embodiment.

Below, an embodiment of the present invention is described with reference to the drawings. FIG. 1 shows the overall constitution of the present embodiment.

The present system is made up of presentation layer(s) 1, business logic layer(s) 2, and data services layer(s) 3.

Presentation layer(s) 1 comprises web (Word Wide Web) client(s) 11, web (Word Wide Web) server(s) 12, and VB (Visual Basic) client(s) 13.

Business logic layer(s) 2 is provided with RtFA server(s) 14, server computer system(s) on which framework architecture (referred to in the present specification as "RtFA" or "Real Time Framework Architecture") in accordance with the principles of the present invention has been applied. RtFA server(s) 14 comprises server computer system(s) performing messaging service(s) (hereinafter simply "messaging service(s)") 15 and server computer system(s) performing framework service(s) (hereinafter simply "framework service(s)") 16. Messaging service(s) 15 and framework service(s) 16 are typically implemented using separate respective computer machines or separate respective sets of computer machines. However, this need not be the case, as it is also possible to implement messaging service(s) 15 and framework service(s) 16 on the same computer machine or set of computer machines.

Messaging service(s) 15 controls or control the passing of messages between client(s) 11, 13 and RtFA server(s) 14. That is, messaging service(s) 15 might receive request message(s) for some sort of processing from client(s) 11, 13 and might pass such request message(s) to framework service(s) 16 capable of carrying out such requested processing. Or messaging service(s) 15 might receive reply message(s) indicating results of processing which has been executed from framework service(s) 16 and might furthermore, depending on the situation, receive additional request message(s) for subsequent additional processing. Messaging service(s) 15 might send such reply message(s) to client(s) 11, 13 and/or might again pass additional request message(s) to framework service(s) 16.

Each message handled by messaging service(s) 15 may comprise subject ID(s), which is or are identification code(s) indicating subject(s) of that message (e.g., purchase log request, inventory update request, accounts payable log request, etc.). Such subject ID(s) may be used for the purpose of selection of destination(s) for such message(s) by messaging service(s) 15 and/or framework service(s) 16, as will be described below, for which reason they are also called "destination subject ID(s)."

Framework service(s) 16 have a plurality of sets of business logic for respective processing of a variety of types of messages (e.g., purchase processing business logic, inventory processing business logic, accounts payable processing business logic, message conversion business logic, etc.). Upon receipt of some message(s) from messaging service(s) 15, framework service(s) 16 might select business logic for processing of such message(s) based on subject ID(s) of such message(s) and might call such selected business logic. Such business logic, upon being called, might carry out processing in correspondence to content of such message(s) and might update data at data services layer 3. Computer program(s) for messaging service(s) 15 and framework service(s) 16 might, for example, be represented in the JAVA™ language.

Data services layer 3 is provided with database server(s) ("DB server(s)") 17.

Communication connection(s) can be established between web client(s) 11 and web server(s) 12 via HTTP or socket(s). Direct communication connection(s) can be established between web client(s) 11 and RtFA server(s) 14 via socket(s). Direct communication connection(s) can be established between VB client(s) 13 and RtFA server(s) 14 via socket(s). Furthermore, direct communication connection(s) can be established between web server(s) 12 and RtFA server(s) 14 via socket(s). Moreover, communication connection(s) can be established between RtFA server(s) 14 and DB server(s) 17 via JDBC.

Figure 2:
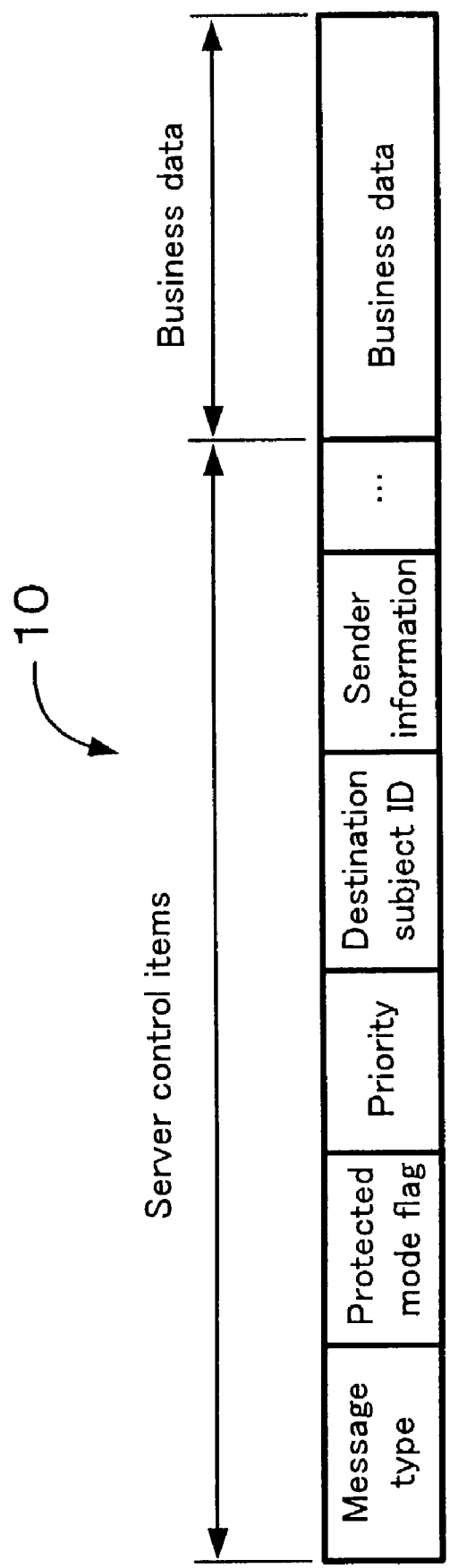
FIG. 2 is a block diagram showing the constitution of a message handled by RtFA server(s) 14.

FIG. 2 shows the constitution of a message handled by RtFA server(s) 14.

As shown in FIG. 2, a message 10 may be made up of a plurality of server control items and business data. Server control items are various data for control of RtFA server(s) 14, and may, for example, comprise message type(s), protected mode flag(s), priority or priorities, subject ID(s) (destination subject ID(s)), sender information, and so forth.

"Message type(s)" indicates whether such message(s) is or are P to P (Point to Point) or P to M (Point to Many). As used herein, "P to P" refers to communication of message(s) sent from a single computer system to another single computer system; i.e., one-to-one communication. As an example of P to P communication, a purchase log request message from a particular client might be sent to a particular framework service which performs purchasing processing. On the other hand, "P to M" refers to communication of message(s) sent from one computer system or a plurality of computer systems to different plurality of computer systems; i.e., one-to-plurality or plurality-to-plurality communication. As an example of P to M communication, a message indicating inventory update results from one particular framework service might be sent to a plurality of client terminals responsible for front-office tasks.

"Protected mode flag(s)" indicates whether the message(s) is to be protected (i.e., whether to make certain that such message(s) has been sent and processed) ("G") or not protected ("N"). When message(s) having protected mode flag(s) set to "N" is or are received, messaging service(s) 15 might place such message(s) in message queue(s) employing volatile semiconductor memory or memories (hereinafter "memory queue(s)"). On the other hand, when message(s) having protected mode flag(s) set to "G" is or are received, messaging service(s) 15 might place such message(s) in message queue(s) employing nonvolatile disk storage (hereinafter "DB (database) queue(s)") and might continue to store such message(s) in DB queue(s) after such message(s) has or have been sent. Accordingly, in the case of message(s) having protected mode flag(s) set to "G," the same message(s) can be resent in the event of bad transmission, system failure, or other such problem.

"Priority or priorities" indicates priority level(s) with which such message(s) is or are to be processed. For example, there might be 3 priority classes such as high ("H"), normal ("N"), and low ("L"). As described below, at one or more times when there are plurality of messages in message queue(s), messaging service(s) 15 may control order(s) in which such messages are retrieved from message queue(s) in correspondence to respective priority or priorities of such messages.

"Subject ID(s) (destination subject ID(s))," as already mentioned, is or are identification code(s) indicating message subject type(s). As described below, messaging service(s) 15, upon receipt of message(s), might select computer system(s) (e.g., client(s), framework service(s), other messaging service(s), and/or the like) to serve as destination(s) for such message(s) based on subject ID(s) of such message(s). Furthermore, framework service(s) 16, upon receipt of message(s), might select business logic to be called for processing of such message(s) based on subject ID(s) of such message(s).

"Sender information" indicates sender subject(s), IP address(es), computer name(s), and/or the like.

Figure 3:
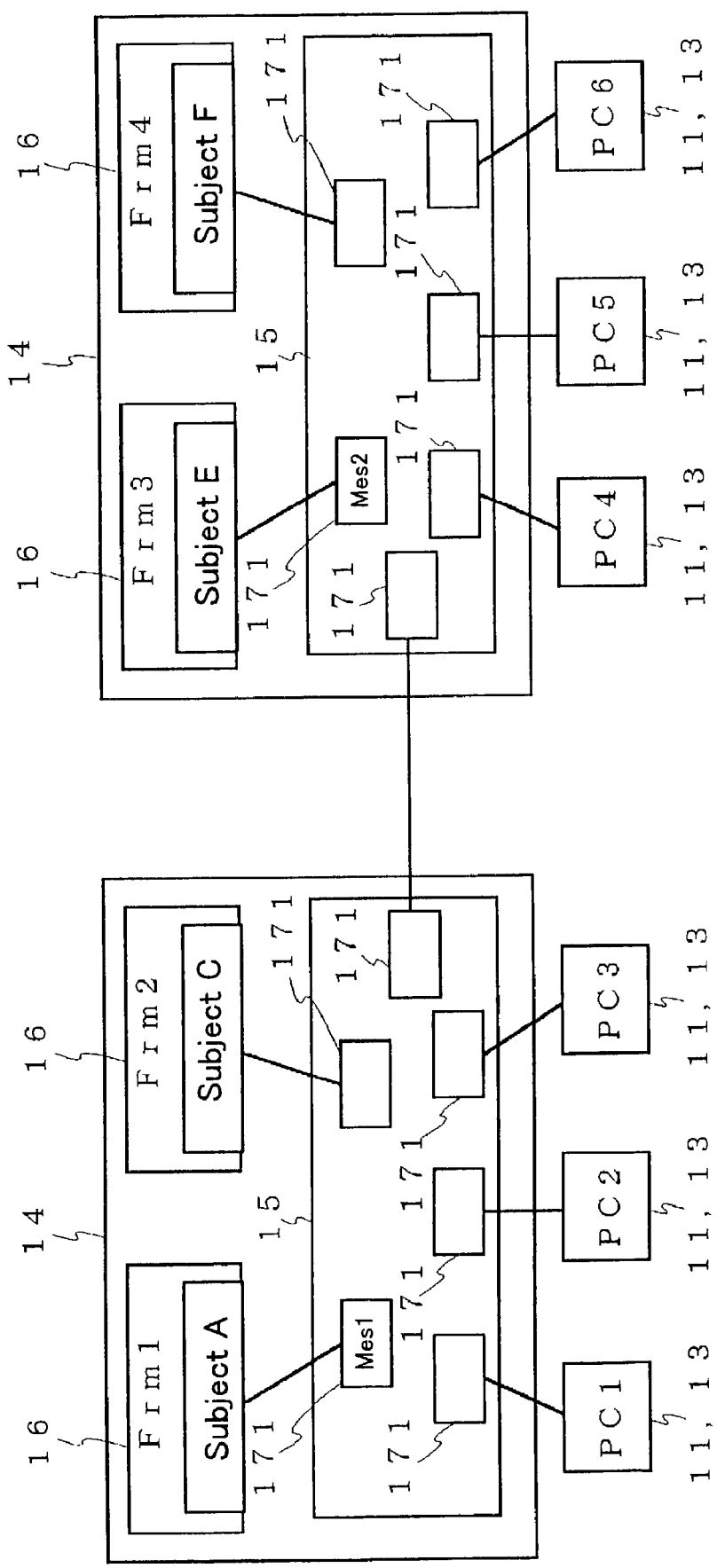
FIG. 3 is a drawing of the constitution of RtFA servers 14.

FIG. 3 is a drawing of the constitution of RtFA servers 14.

In the previous description with reference to FIG. 1, only one RtFA server 14 was indicated. However, as shown in FIG. 3, a plurality of RtFA servers 14 may actually be provided. While two RtFA servers 14 are provided in the example shown in FIG. 3, more RtFA servers 14 may also be provided.

As shown in FIG. 3, each RtFA server 14 may be provided with one messaging service 15 and one or more framework service(s) 16, the messaging service 15 and the framework service(s) 16 being connected so as to be capable of mutual communication. A messaging service 15 may moreover be connected so as to be capable of communication with one or more client(s) 11, 13. A messaging service 15 may process in parallel fashion a plurality of threads respectively communicating with client(s) 11, 13 and framework service(s) 16.

Because there are a plurality of RtFA servers 14, there are a plurality of sets comprising messaging service 15 and framework services 16. In addition, messaging services 15 of the plurality of RtFA servers 14 may be connected so as to be capable of mutual communication. Messaging service(s) 15 of each RtFA server 14 may also be provided with thread(s) 171 capable of processing communications with messaging service(s) 15 of other RtFA server(s) 14. The plurality of communication threads 171 belonging to each messaging service 15 may respectively possess keep-alive functionality, this functionality mutually ensuring maintenance of normal operations between such messaging service 15 and the client(s) 11, 13, other messaging service(s) 15, and/or framework service(s) 16 connected thereto.

Figure 4:
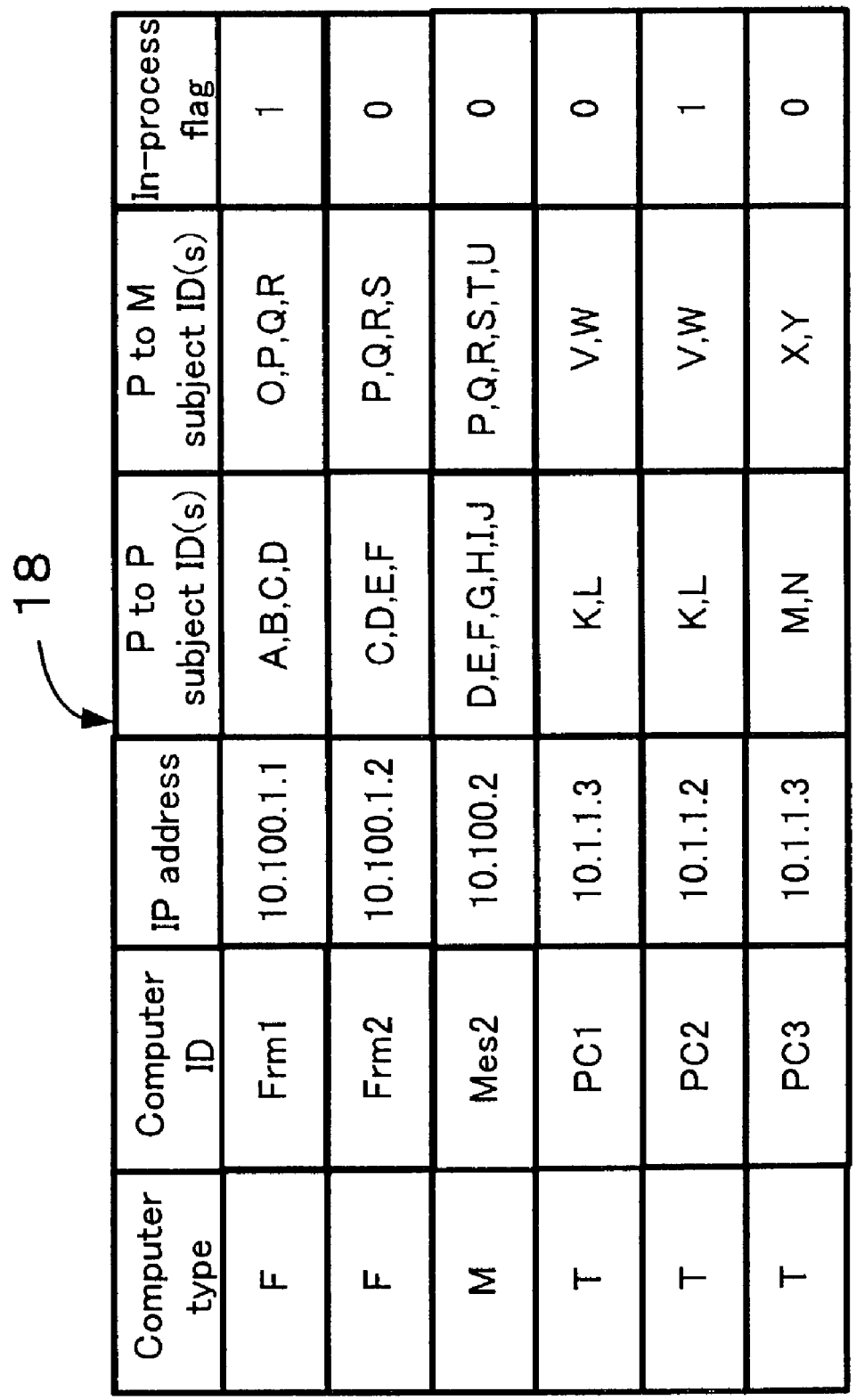
FIG. 4 shows an example of a management table 18 associated with messaging service(s) 15.

Furthermore, management table(s) 18 such as that shown by way of example at FIG. 4 may be associated with each messaging service 15. Managed within management table 18 is or are path(s) to be used by such messaging service(s) 15 in delivering message(s); in other words, destination(s) for message(s) handled by such messaging service(s) 15. As shown at FIG. 4, type(s), computer ID(s), IP address(es), P to P subject ID(s), P to M subject ID(s), in-process flag(s), and the like may be registered in management table(s) 18 for each and every computer system (client(s) 11, 13, other messaging service(s) 15, and framework service(s) 16) connected to such messaging service(s) 15.

"Type(s)" indicates type(s) of such computer system(s); e.g., whether framework service(s) (F), messaging service(s) (M), and/or client terminal(s) (T).

"Computer ID(s)" and "IP address(es)" indicate identification code(s) unique to such computer system(s) and IP address(es) thereof.

"P to P subject ID(s)" indicates subject ID(s) (destination subject ID(s)) of P to P message(s) awaited by such computer system(s) (meaning that such computer system(s) is or are capable of becoming destination(s) for such message(s)). A plurality of P to P subject IDs may be registered for each respective computer system.

"P to M subject ID(s)" indicates subject ID(s) (destination subject ID(s)) of P to M message(s) awaited by such computer system(s) (meaning that such computer system(s) is or are capable of becoming destination(s) for such message(s)). A plurality of P to M subject IDs may be registered for each respective computer system.

"In-process flag(s)" indicates whether ("1") or not ("0") thread(s) 171 for communication with such computer system(s) is or are involved in ongoing P to P communication process(es).

The management table 18 shown in FIG. 4, being an example applicable to the case of messaging service Mes1 shown at the left side of FIG. 3, contains registered therein all computer systems connected to messaging service Mes1 shown at left; i.e., the two framework services Frm1 and Frm2, the messaging service Mes2 shown at right, and the three client terminals PC1, PC2, and PC3. In the present example, a first framework service Frm1 awaits four P to P message types respectively having subject IDs of "A," "B," "C," and "D, " and awaits four P to M message types respectively having subject IDs of "O," "P," "Q," and "R."

Furthermore, messaging service Mes2 shown at the right side of the drawing awaits seven P to P message types respectively having subject IDs of "D," "E," "F," "H," "I," and "J" from messaging service Mes1 shown at left, and awaits six P to M message types respectively having subject IDs of "P," "T," and "U" from messaging service Mes1 shown at left.

With reference again to FIG. 3, each messaging service 15, upon receipt of message(s), determines whether such message(s) is or are P to P message(s) or P to M message(s). At one or more times when P to P message(s) is or are received, messaging service(s) 15 might reference management table(s) 18 associated with such messaging service(s) 15 and as shown by way of example in FIG. 4, search for computer system(s) awaiting message(s) having P to P subject ID(s) matching subject ID(s) of such received message(s), select among one or more computer system(s) found as a result of such search one computer system having in-process flag(s) set to "0," and send such received message(s) to the one selected computer system. Furthermore, at one or more times when P to M message(s) is or are received, messaging service(s) 15 might reference management table(s) 18 associated with such messaging service(s) 15 and as shown by way of example in FIG. 4, select all computer system(s) awaiting message(s) having P to M subject ID(s) matching subject ID(s) of such received message(s), and send such received message(s) to all selected computer system(s).

Figure 5:
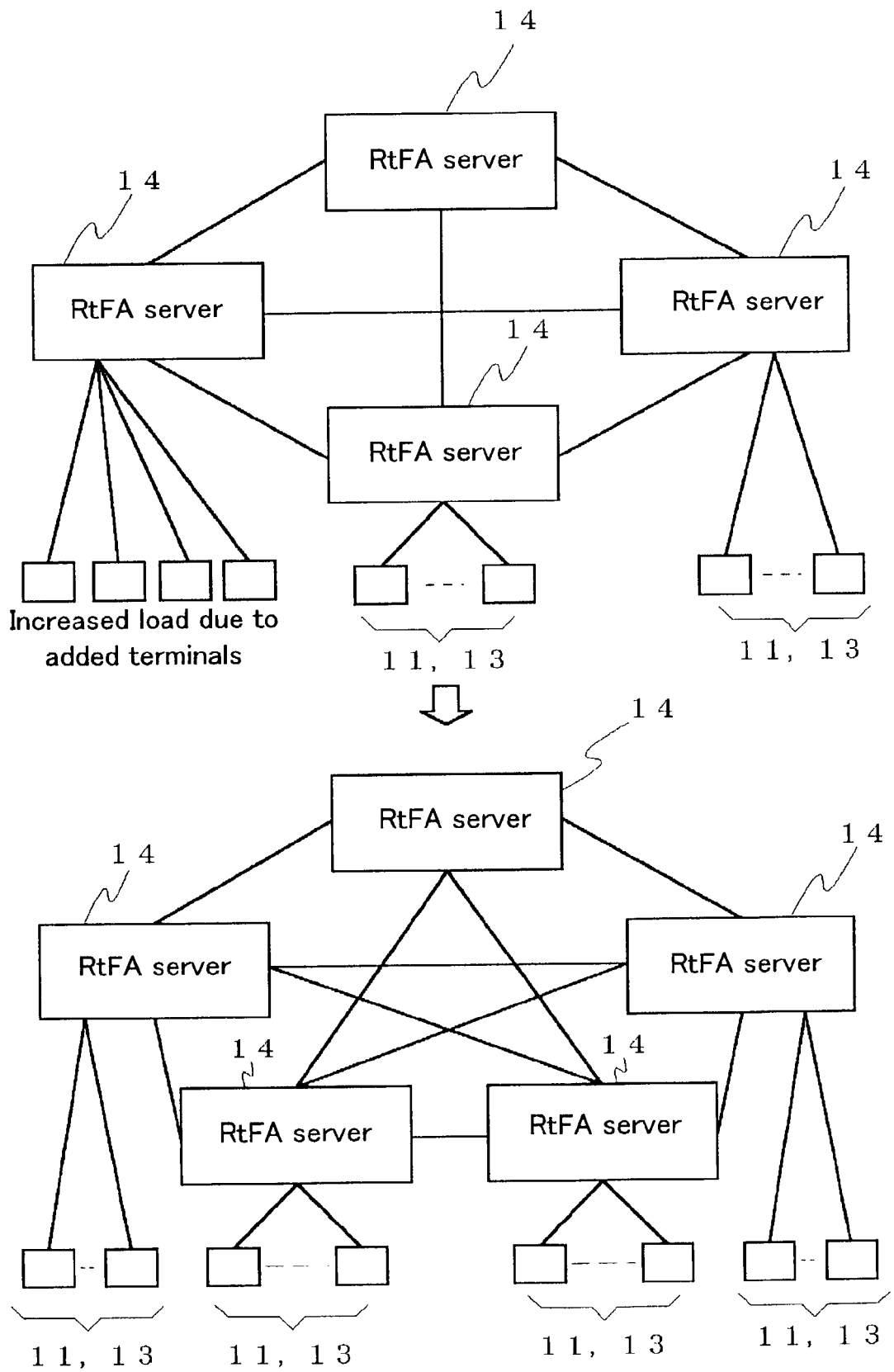
FIG. 5 is a drawing of the constitution of connections among a plurality of RtFA servers.
Figure 6:
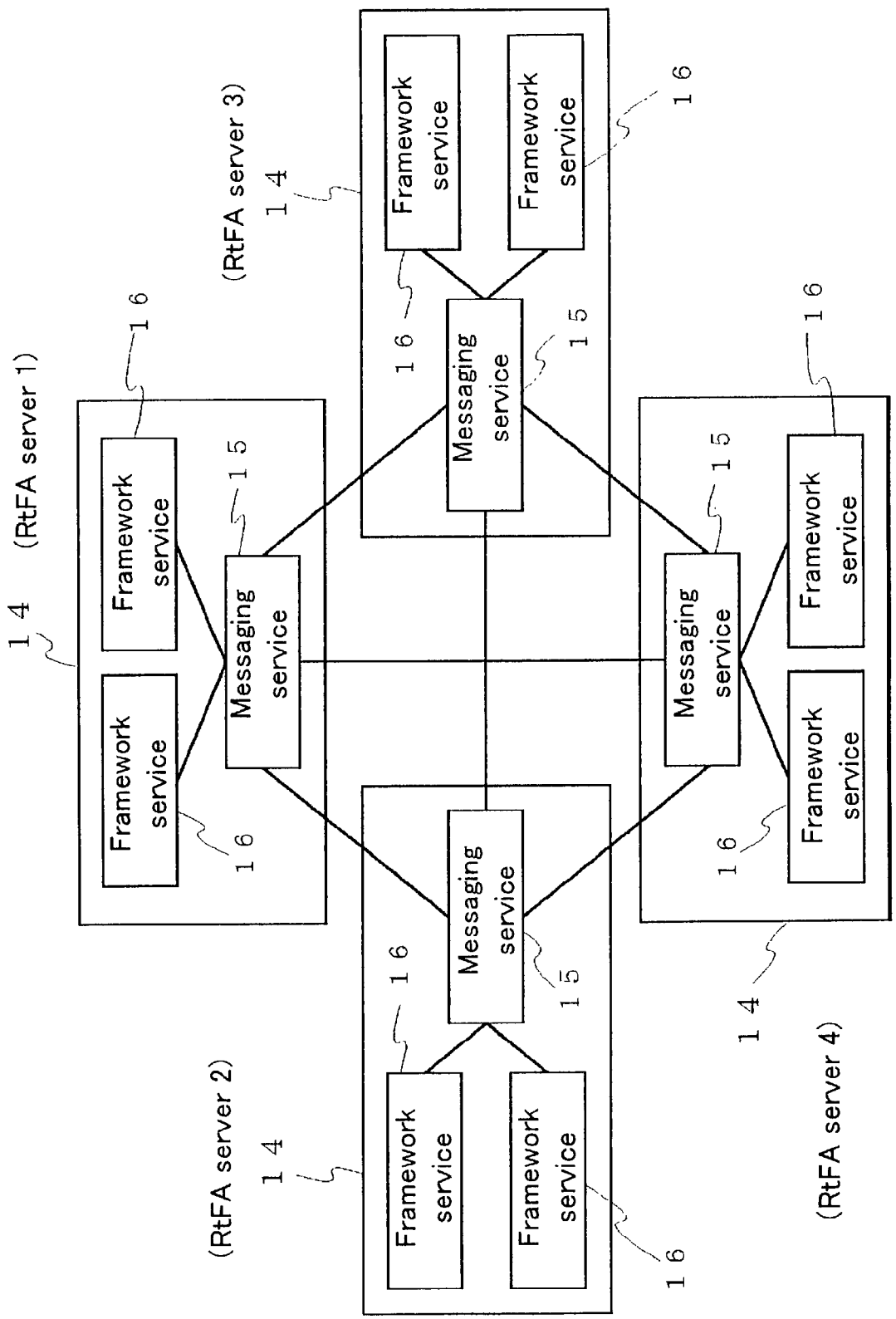
FIG. 6 is a drawing of the constitution of connections among a plurality of messaging services.

FIG. 5 is a drawing of the constitution of connections among a plurality of RtFA servers. FIG. 6 is a drawing of the constitution of connections between or among messaging service(s) and/or framework service(s) within a plurality of RtFA servers 14.

As shown at both the top and bottom halves of FIG. 5, each RtFA server 14 may be connected so as to be capable of mutual communication with all other RtFA server(s) 14. That is, as shown in FIG. 6, messaging service(s) 15 of each RtFA server 14 may be connected so as to be capable of mutual communication with messaging service(s) 15 of all other RtFA server(s) 14. A plurality of components are said to be connected in "mesh" fashion when they are respectively connected in this way so as to be capable of mutual communication with all other such components. Furthermore, as shown in FIG. 6, each messaging service 15 may be connected so as to be capable of direct communication with a plurality of framework services 16.

Each messaging service 15 among a plurality of messaging services 15 connected in mesh fashion in this way might execute the aforementioned keep-alive functionality during a prescribed time period; e.g., at startup time. That is, at startup, each messaging service 15 might connect in turn to all other messaging service(s) already registered in management table(s) 18 thereof and communicate, to all other messaging service(s) to which it is connected, subject ID(s) of message(s) awaited by client(s) 11, 13 and framework service(s) 16 connected thereto. Such communicated subject ID(s) might be registered in management table(s) of other messaging service(s) as subject ID(s) of message(s) awaited by such messaging service 15 from such other messaging service(s). Furthermore, each messaging service 15, in the event that connection cannot be made to other message(s) despite attempt(s) to connect thereto, might at fixed intervals thereafter make a plurality of subsequent attempts to connect thereto. Furthermore, each messaging service 15, at one or more times when connection request(s) is or are received from other messaging service(s) which are not yet registered in management table(s) 18 thereof, might connect to such unregistered messaging service(s), carry out exchange with such unregistered messaging service(s) of subject ID(s) and/or the like respectively awaited by each, and might register such messaging service(s) in management table(s) 18 thereof. By virtue of such keep-alive functionality, in the event that particular messaging service(s) 15 is or are not operating normally (e.g., due to system crash) the other, normally operating messaging service(s) 15 can respectively remove such particular messaging service(s) 15 which is or are not operating normally from message relay path(s) and reference its or their own management table(s) 18 to automatically select different relay path(s).

Next, types of communication services provided by messaging service(s) 15 are described with reference to FIGS. 7 through 9. Among the types of data distribution services which may be provided by messaging service(s) 15 there are the two types represented by P to M (one-to-many) processing and P to P (one-to-one) processing.

As mentioned above, P to M communication processing is processing by which messaging service(s) 15 might distribute received P to M message(s) to all computer system(s) awaiting same based on P to M subject ID(s) of respective computer system(s) registered in management table(s) 18 such as is shown by way of example in FIG. 4. For example, P to M communication processing might be used every time that market information is updated, to distribute from anywhere between 1 and n RtFA server(s) to n client(s) a message containing such updated market information.

On the other hand, as mentioned above, P to P communication processing is processing by which messaging service(s) 15 might send received P to P message(s) to one among a number of computer system(s) awaiting same based on P to P subject ID(s) of respective computer system(s) registered in management table(s) 18 such as is shown by way of example in FIG. 4. For example, P to P communication processing might be used to send request message(s) from client(s) for particular processing to one framework service having business logic capable of carrying out such processing.

Figure 7:
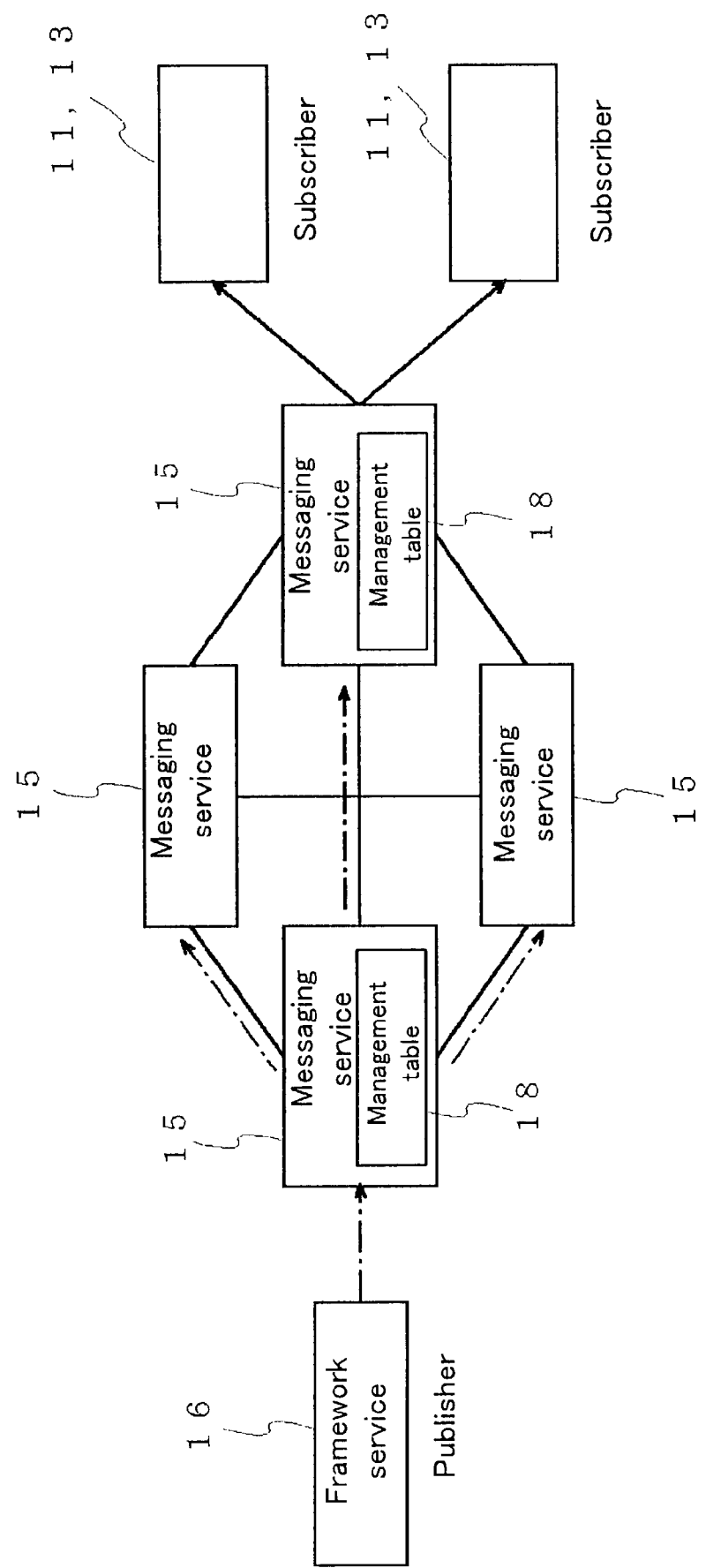
FIG. 7 is an explanatory drawing showing one way in which message(s) subjected to P to M (one-to-many) processing may be relayed.

FIG. 7 shows one example of a way in which message(s) subjected to P to M communication processing may be relayed. Particular P to M message(s) output by particular framework service(s) 16 serving as publisher(s) might be distributed to all messaging service(s) 15 awaiting such message(s), and such message(s) might furthermore be distributed from such messaging service(s) 15 to all client(s) 11, 13 awaiting such message(s).

Figure 8:
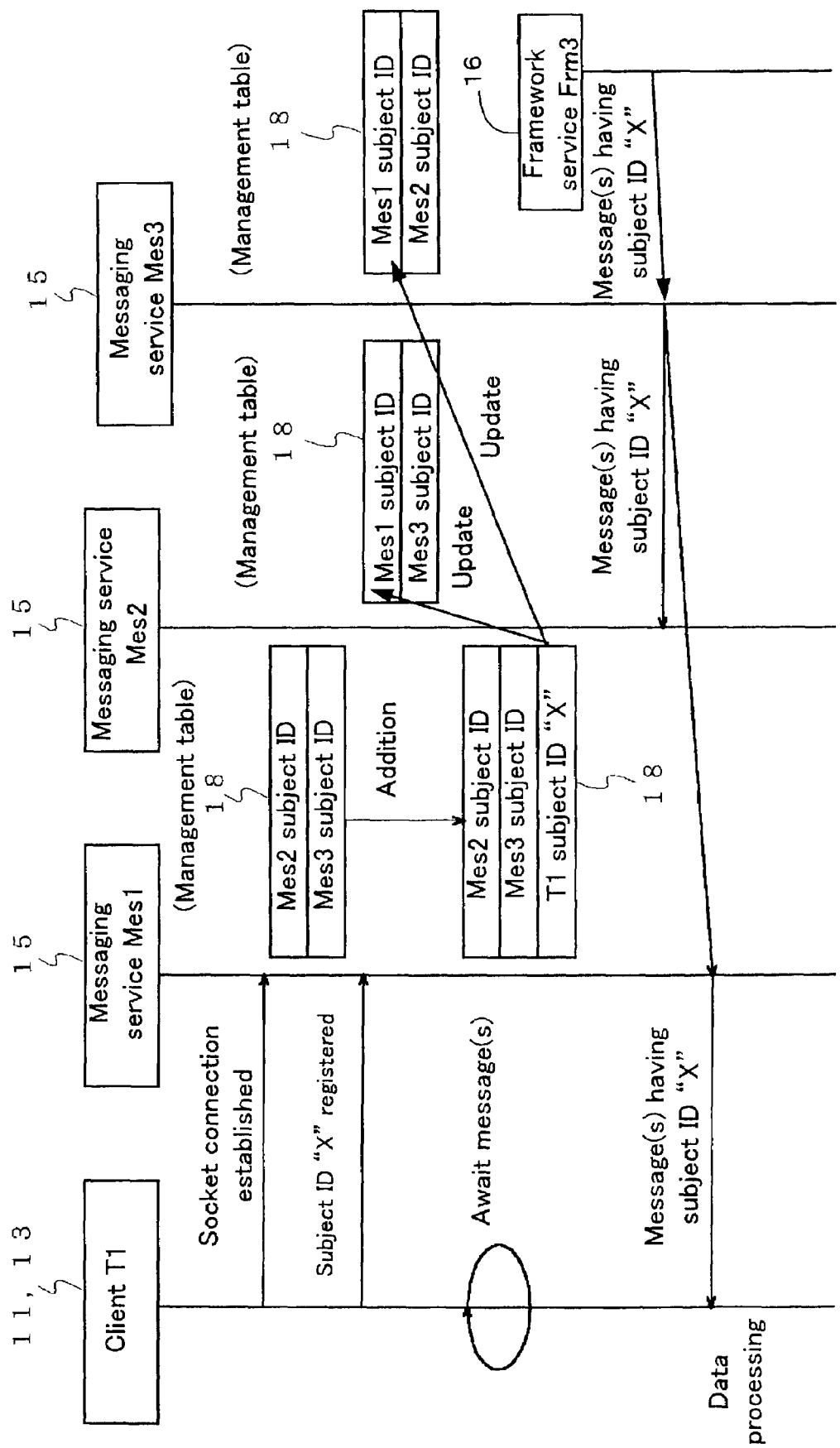
FIG. 8 is a flowchart showing an example of P to M communication processing.

FIG. 8 is a flowchart showing an example of P to M communication processing. Client T1 serving as subscriber might establish a connection with a prescribed messaging service Mes1 via socket(s). Client T1 might furthermore register with such messaging service Mes1 a subject ID "X" for P to M message(s) that it awaits. Such messaging service Mes1 might add to management table(s) 18 associated therewith a P to M subject ID of "X" for client T1. Client T1, for its part, might await delivery of message(s) from messaging service Mes1. At a time when other messaging services Mes2, Mes3, which are connected to messaging service Mes1, are thereafter started up, P to M subject ID "X" already registered at management table(s) 18 of messaging service Mes1 might be communicated to the other messaging services Mes2, Mes3, with P to M subject ID "X" being added to their management tables 18 for messaging service Mes1.

In such a case, upon distribution of P to M message(s) having subject ID "X" from framework service Frm3 serving as publisher, messaging service Mes3 upon receiving same might reference management table(s) 18 associated therewith, identify all messaging service(s) Mes1, Mes2 awaiting subject ID "X", and transfer such message(s) thereto.

Messaging service Mes1 connected to client T1, upon receiving such message(s), might identify client T1, which awaits subject ID "X", based on management table(s) 18 associated therewith and might deliver such message(s) to that client T1.

While not shown in the drawings, each framework service may also communicate subject ID(s) of P to M message(s) awaited by that framework service to messaging service(s) capable of direct communication with that framework service. Doing so will make it possible for P to M subject ID(s) awaited by that framework service to be registered in management table(s) of such messaging service(s). Such messaging service(s) might thereafter communicate to all other messaging service(s) that such framework service P to M message subject ID(s) registered in management table(s) thereof are P to M subject ID(s) awaited by such messaging service(s). Doing so will make it possible for P to M subject ID(s) awaited by that framework service to become registered in management table(s) of all other messaging service(s) as well. As a result, that framework service would be able to receive message(s) having P to M subject ID(s) from any messaging service.

Figure 9:
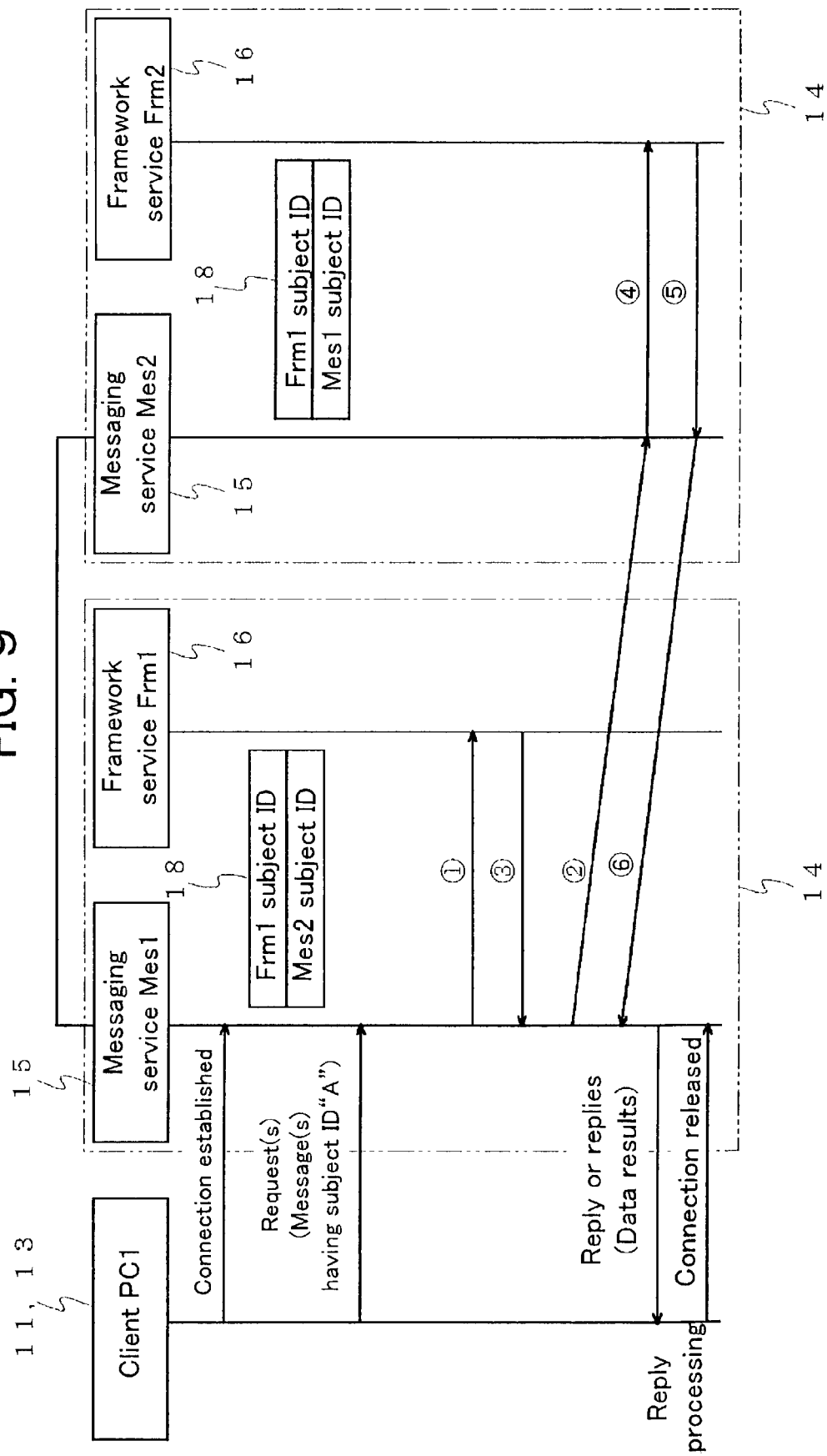
FIG. 9 is a flowchart showing an example of P to P (one-to-one) processing.

Next, FIG. 9 is a flowchart showing P to P communication processing.

In the same fashion as the registration of P to M subject ID(s) in management table(s) described above, P to P subject ID(s) respectively awaited by client(s) and/or framework service(s) capable of direct communication therewith, and/or P to P subject ID(s) respectively awaited by any and/or all of the other messaging service(s), may be automatically registered in advance in management table(s) of each messaging service.

Under such circumstances, as shown in FIG. 9, a particular client PC1 might establish a connection with a prescribed messaging service Mes1.

If P to P request message(s) having a particular subject ID "A" is or are then sent from client PC1, a messaging service Mes1 receiving same might reference its management table(s) 18, select one computer system, e.g., framework service Frm1, from among a number of computer system(s) awaiting such subject ID "A", and pass such request message(s) thereto (arrow (1̂). Framework service Frm1 might call business logic corresponding to subject ID "A" of received request message(s), perform processing pursuant to such message(s), and return reply message(s) indicating results of such processing to messaging service Mes1 (arrow 3̂)). In addition, messaging service Mes1 might send such reply message(s) to client PC1 in the form of a reply thereto. Client PC1, upon obtaining such reply message(s), might release its connection with messaging service Mes1.

Alternatively, instead of or in addition to sending request message(s) having subject ID "A" and received from client PC1 to framework service Frm1 as in the example described above, messaging service Mes1 might send same to another messaging service Mes2 awaiting subject ID "A" (arrow 2̂)). Such a situation might occur if for example framework service Frm1 is engaged in ongoing process(es) but messaging service Mes2 is not engaged in ongoing process(es). In such a situation, messaging service Mes2, upon receiving such request message(s), might reference its management table(s) 18, select a computer system, e.g., framework service Frm2, awaiting such subject ID "A", and pass such request message(s) thereto for processing (arrow (1̂). Upon return thereto from framework service Frm2 of reply message(s) indicating results of processing (arrow(5̂), messaging service Mes2 might return such reply message(s) to messaging service Mes1 (arrow (6̂), and messaging service Mes1 might moreover return such reply message(s) to client PC1.

As described above, a messaging service 15 may send message(s) not only to framework service(s) 16 with which it is capable of direct communication but may also send message(s) to other framework service(s) via other messaging service(s). This permits load balancing to take place among a plurality of RtFA servers 14.

Figure 10:
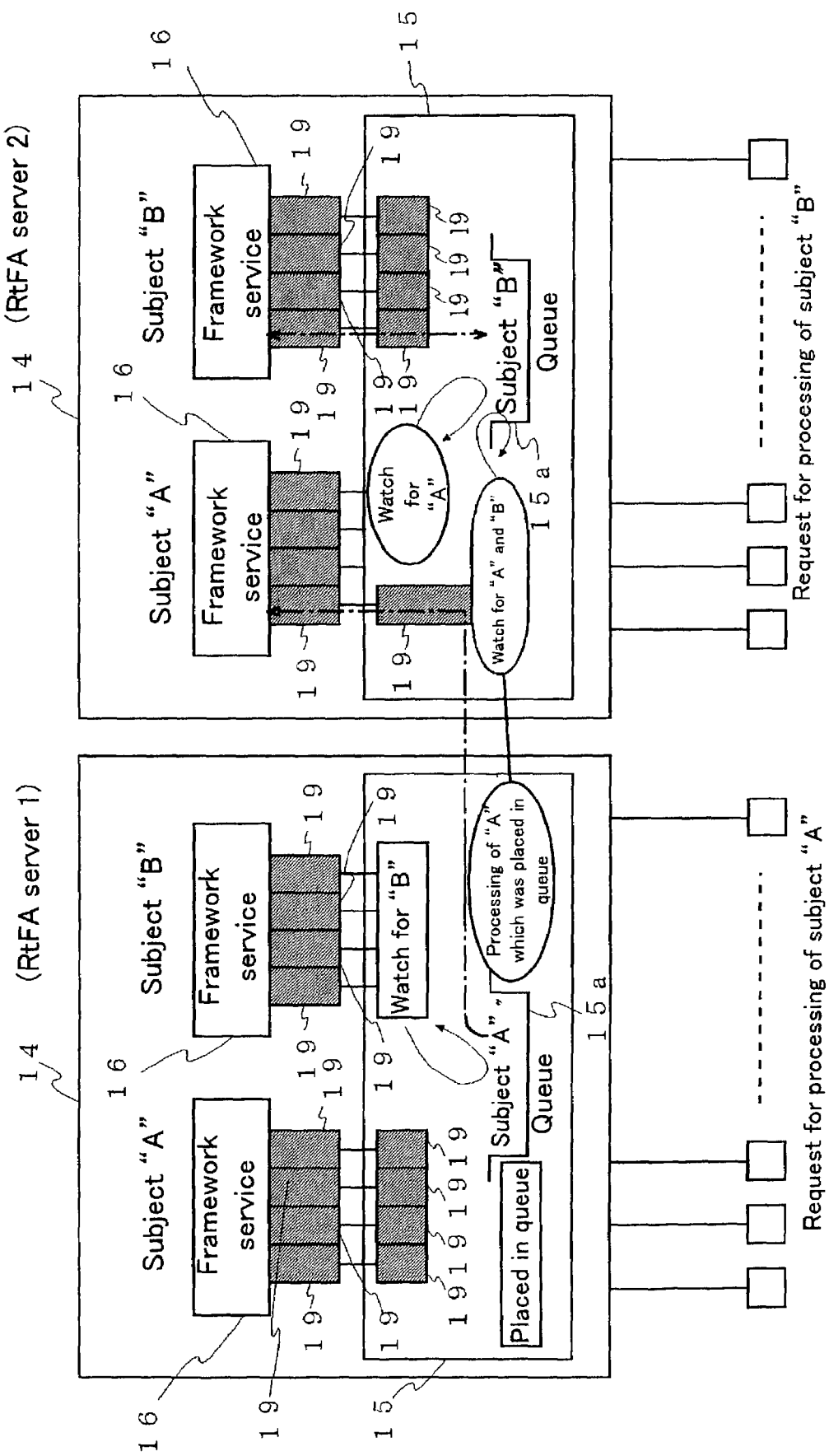
FIG. 10 is an explanatory drawing showing messaging service load balancing functionality.

FIG. 10 is an explanatory drawing showing a load balancing functionality which messaging service(s) may possess.

As shown in FIG. 10, respective framework service(s) 16 at respective RtFA server(s) 14 may process in parallel fashion a plurality of threads 19 communicating with messaging service(s) 15. Furthermore, each messaging service 15 may be provided with message queue(s) 15a capable of temporarily holding message(s) received from client(s).

Each message stored in message queue(s) 15a of messaging service(s) 15 might be passed to some framework service(s) 16 corresponding to subject ID(s) of such message in accordance with management table(s) associated with such messaging service(s) 15. In such a case, such messaging service(s) 15 may pass such message to specific framework service(s) 16 capable of direct communication therewith and awaiting such subject ID(s). But if at such time none of thread(s) 19 of such specific framework service(s) 16 is or are open (it or they is or are busy, being engaged in ongoing process(es)), such messaging service(s) 15 might pass such message not to such framework service(s) 16 which is or are busy but to other messaging service(s) 15 awaiting such subject ID(s). Such other messaging service(s) 15 receiving such message may pass such message to specific framework service(s) 16 awaiting such subject ID(s) and with which such other messaging service(s) 15 is or are capable of direct communication. To make such relay of message(s) possible, each messaging service 15 might regularly monitor its message queue(s) 15a, and in the event that message(s) waiting to be processed is or are present in such message queue(s) 15a might immediately retrieve message(s) from such queue(s), refer to its management table(s) so as to promptly determine destination(s) for such message(s), and send such message(s) thereto. This permits load balancing among a plurality of RtFA servers. Each message may consequently be processed as quickly as possible, making it possible for back-office tasks which were conventionally carried out through batch processing at night to be carried out quickly and in almost real-time fashion.

Constitution of framework service(s) 16 is next described.

Figure 11:
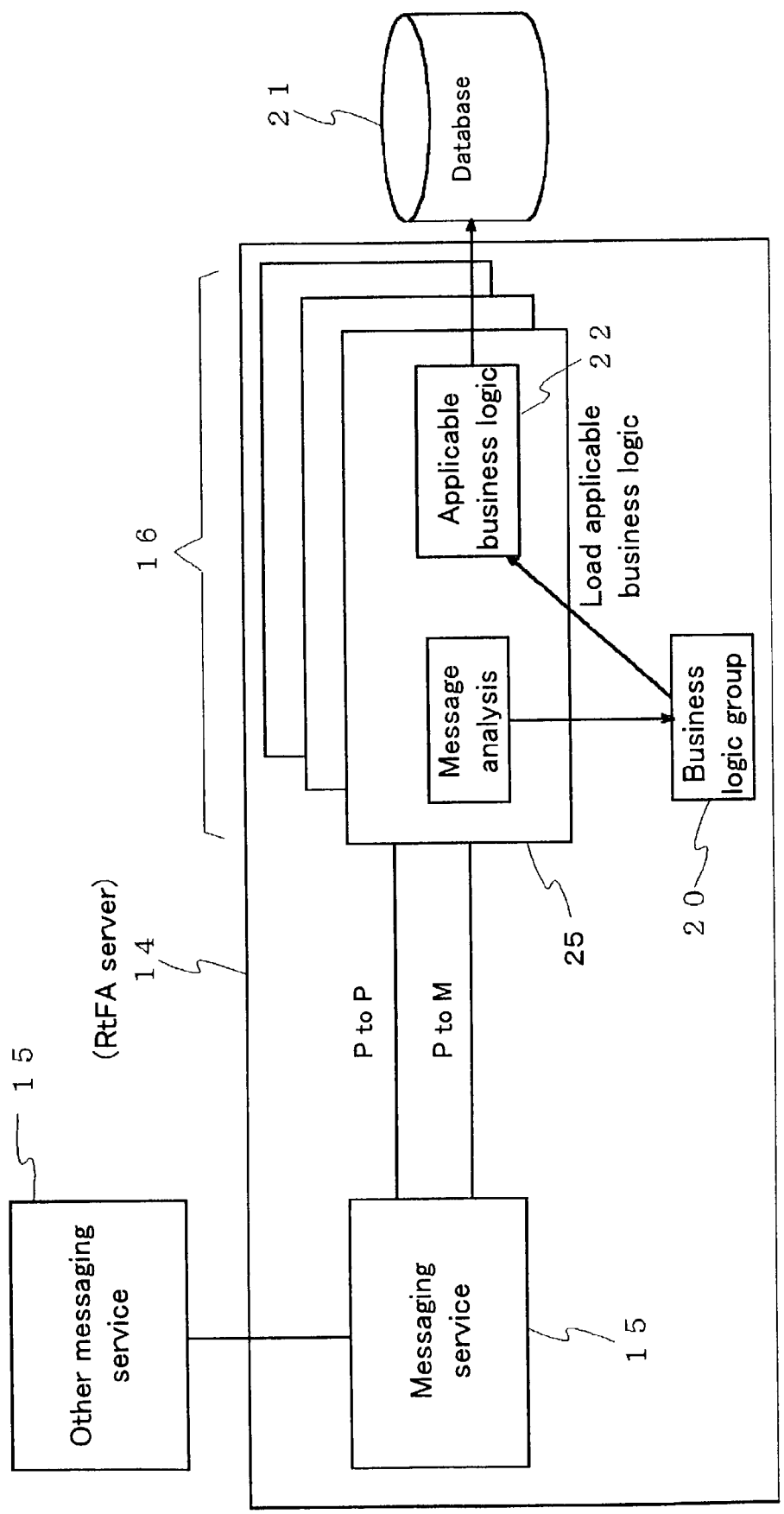
FIG. 11 is a block diagram showing framework service constitution.

FIG. 11 shows constitution of a framework service 16.

A parallel processing by a plurality of framework threads 25 may constitute the essence of framework service 16. Each framework thread 25 might respectively access a previously prepared group of business logic 20, and might load and execute specific business logic 22 corresponding to subject ID(s) of message(s) passed thereto from messaging service(s) 15. What is here referred to as business logic is a process or processes, e.g., programmed using Java code, which carries or carry out the various types of message processing peculiar thereto. Most of the major business logic components make requests of database(s) 21 managed by database server(s) 17 for prescribed operation(s) to be carried out in correspondence to message content.

Figure 12:
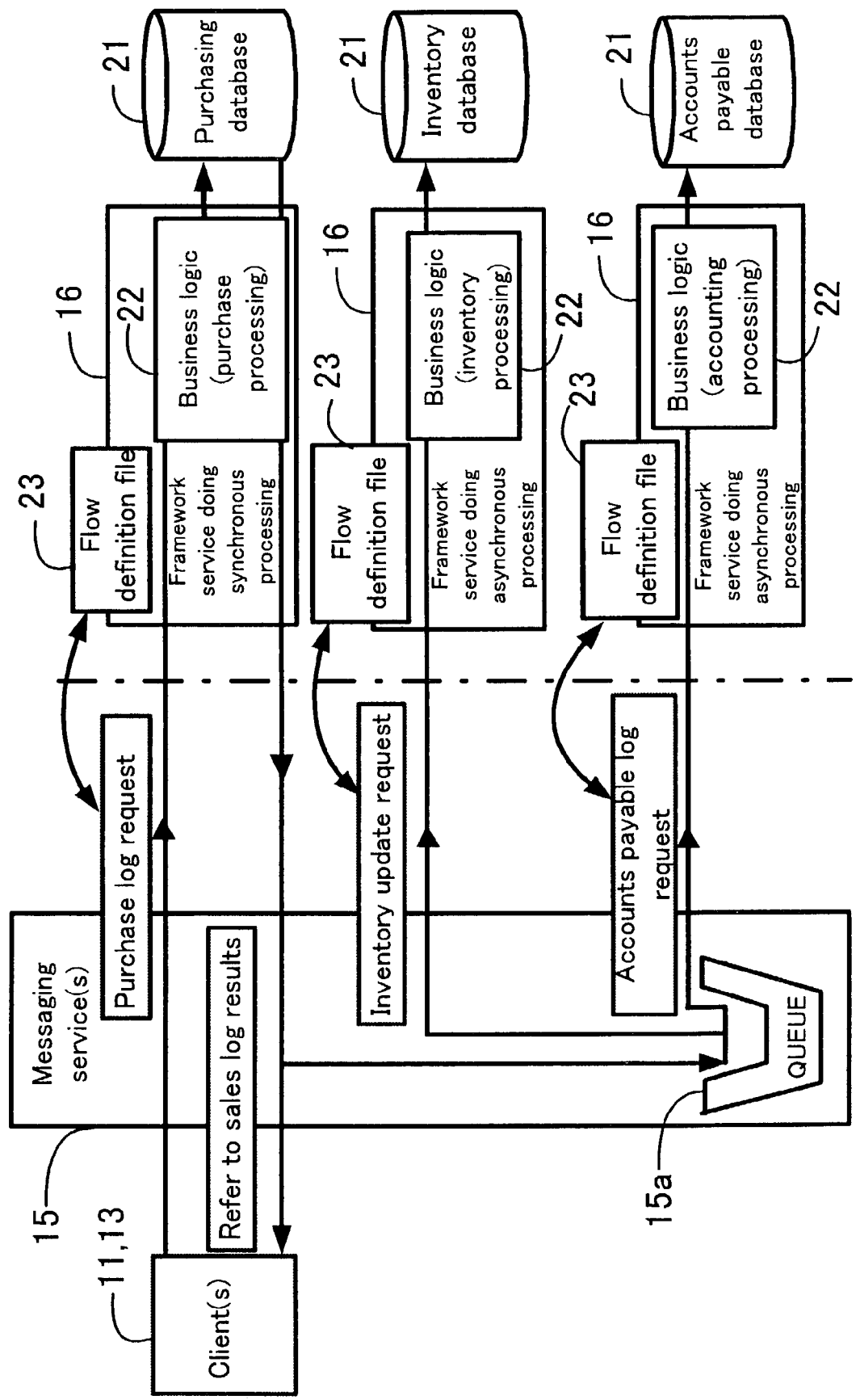
FIG. 12 is a drawing to assist in describing framework service operation.

FIG. 12 is a drawing to assist in describing operation of framework service(s) 16.

Operation of business logic associated with framework service(s) 16 can be broadly categorized into two categories as being either synchronous or asynchronous. There are situations where framework service(s) 16 may, responsive to particular request message(s) from client(s), execute only a single set of business logic. Furthermore, there are also situations where framework service(s) 16 may execute a single set of business logic in direct response to particular request message(s), with one or more sets of business logic being subsequently executed in linked fashion therewith. FIG. 12 shows an example in which business logic for executing purchase processing is executed in direct response to purchase log request message(s) from client(s) 11, 13, with the two subsequent sets of business logic represented by inventory processing and accounting processing being executed in linked fashion therewith.

Where only a single set of business logic is to be executed, and this in direct response to request message(s) from client(s), framework service(s) 16 might ordinarily execute such single set of business logic in synchronous fashion and return reply message(s) indicating results of such execution to client(s).

In contradistinction hereto, where a single set of business logic is to be executed in direct response to request message(s) from client(s), following which one or more subsequent sets of business logic is or are to be executed in linked fashion with respect thereto, framework service(s) 16 might ordinarily execute such initial single set of business logic in synchronous fashion but could execute such second and/or following set(s) of business logic in synchronous fashion or could execute same in asynchronous fashion. FIG. 12 shows an example in which only an initial set of business logic for purchase processing is executed in synchronous fashion, with subsequent sets of business logic for inventory processing and accounting processing being executed in asynchronous fashion. Where a plurality of sets of business logic are to be executed as in the example at FIG. 12, framework service(s) 16 might, upon completion of all set(s) of business logic to be executed synchronously, return reply message(s) indicating results of such execution to client(s). Business logic to be executed asynchronously might be executed in background or separately from such client(s) (i.e., offline of such client(s)).

As shown in FIG. 12, framework service(s) 16 might possess flow definition file(s) 23 containing schedule(s) (containing name of single set of business logic to be executed initially; subject ID(s) of message(s) to be passed to subsequent business logic and manner of linking (synchronous or asynchronous) in case where there are one or more subsequent linked set(s) of business logic; and so forth) for execution of business logic by framework service(s) 16, a separate such schedule being defined for each of the various message subject IDs. Framework service(s) 16 might receive a single message, upon which framework service(s) 16 might reference flow definition file(s) 23, might select business logic execution schedule(s) corresponding to subject ID(s) of such received message, and might execute one or more set(s) of business logic in accordance with such selected schedule(s). As such selected schedule(s) would indicate at least a single set of business logic to be executed in direct response to such message, such framework service(s) might first load and execute such single set of business logic. If such selected schedule(s) furthermore indicated one or more subsequent sets of linked business logic and manner(s) of linking, such framework service(s) might, after executing such initial business logic, execute such subsequent business logic in fashion(s) as determined by such manner(s) of linking (i.e., synchronously and/or asynchronously). Moreover, while there are cases where the first set of business logic and subsequent set(s) of business logic are executed by the same framework service(s), there are also case where in accordance with the aforementioned load balancing execution occurs on different framework service(s).

FIG. 13 shows a simple example of a flow definition file 23.

As shown in FIG. 13, a flow definition file 23 might contain a plurality of sentences 231, 232, 233, 234 respectively indicating different business logic execution schedule(s) for different subject ID(s). Such flow definition file 23 may for example be a text file, in which case it would be easy to carry out addition, deletion, modification, and/or other such editing of definition sentences 231, 232, 233, 234 using a text editor or the like.

As described within definition sentence 231 at the very top of FIG. 13, each definition sentence may comprise a plurality of subsentences separated by a semicolon ";". The first subsentence may contain input subject ID(s), log queue name(s), executable business logic name(s), and so forth. The second and/or following subsentence(s) may each contain message conversion business logic name(s), output subject ID(s), linking mode flag(s), and so forth. The first subsentence might relate to a single set of business logic to be executed in direct response to message(s), in which case it would necessarily be indicated in all definition sentence(s). The second and/or following subsentence(s) might relate to one or more set(s) of subsequent business logic to be executed in cooperation with the initial business logic, in which case it or they would only be indicated in cases where there is subsequent business logic.

The meanings of the items in the first subsentence are as described below.

As used herein, "input subject ID(s)" refers to subject ID(s) of message(s) received by framework service(s).

"Log queue name(s)" refers to name(s) of log queue(s) used in the event that such received message(s) is or are written to log(s). For example, "@DEF" might indicate that default log queue(s) is or are to be used, and "@NONE" might indicate that such received message(s) is or are not to be written to log(s).

"Executable business logic name(s)" refers to name(s) of business logic to be executed in direct response to such message(s). In the examples of definition sentences 232 through 234 shown in the drawing, strings identical to input subject IDs are used.

The meanings of the items in each the second and/or following subsentence(s) are as described below.

"Message conversion business logic name(s)" refers to name(s) of message conversion business logic executed in order to convert data results from processing of first business logic into message(s) passed to subsequent business logic. In the event that message conversion is unnecessary, "@NONE" might be written here.

"Output subject ID(s)" refers to subject ID(s) of message(s) passed out to subsequent business logic.

"Linking mode flag(s)" indicates or indicate whether subsequent business logic is to be executed synchronously or executed asynchronously. For example, "SYNC" might indicate synchronous execution, and "ASYNC" might indicate asynchronous execution.

Second definition sentence 232 in FIG. 13 might apply to the example of a schedule listed at (1), below.

(1) Execute business logic named "BuySelBuy" in response to message(s) having subject ID "BuySelBuy" (e.g., purchase search request(s)).

Third definition sentence 233 might apply to the example of a schedule listed at (1)–(3), below.

(1) First, execute business logic named "BuyUpdBuy" (e.g., purchase update processing) in response to message(s) having subject ID "BuyUpdBuy" (e.g., purchase update request(s)).

(2) Next, use conversion business logic named "CnvBuyUpdBuy" to convert the format of data output by first business logic "BuyUpdBuy", create message(s) having subject ID "InvUpdInv" (e.g., inventory update request), and output to messaging service(s).

(3) Subsequent business logic (e.g., inventory update processing) is synchronously executed, with message(s) "InvUpdInv" which was or were output being processed thereby.

Furthermore, fourth definition sentence 234 might apply to the example of a schedule listed at (1)–(5), below.

(1) First, execute business logic named "BuyInsBuy" (e.g., purchase inspection goods update processing) in response to message(s) having subject ID "BuyInsBuy" (e.g., purchase inspection goods update request(s)).

(2) Next, use conversion business logic named "CnvBuyInsBuy1" to convert the format of data output by first business logic "BuyInsBuy", create message(s) having subject ID "InvUpdInv" (e.g., inventory update request), and output to messaging service(s).

(3) Subsequent business logic (e.g., inventory update processing) is asynchronously executed, with message(s) "InvUpdInv" which was or were output being processed thereby.

(4) Furthermore, use conversion business logic named "CnvBuyInsBuy2" to convert the format of data output by first business logic "BuyInsBuy", create message(s) having subject ID "AccDbtBuy" (e.g., accounts payable log request), and output to messaging service(s).

(5) Subsequent business logic (e.g., accounts payable log processing) is asynchronously executed, with message(s) "AccDbtBuy" which was or were output being received thereby.

Reference is made once again to FIG. 12. By referencing flow definition file(s) 23 associated therewith, each framework service 16 can select and execute business logic 22 corresponding to message(s) which is or are the subject of processing, and moreover, can determine whether there is a need for subsequent processing, and if there is such a need, can create request message(s) for the purpose of subsequent processing and can return same to messaging service(s) 15.

In such a case, if processing pursuant to other framework thread(s) representing subsequent processing with respect to processing pursuant to a certain framework thread is to be carried out asynchronously, framework service(s) 16 might first input to queue(s) 15a of messaging service(s) 15 the results (request message(s) for subsequent processing) of processing of business logic pursuant to the first framework thread, with other framework thread(s) thereafter retrieving such request message(s) from queue(s) 15a of messaging service(s) 15 to carry out subsequent processing. In such a case, the framework service(s) 16 performing the first processing may be either the same as or different from the framework service(s) 16 performing the subsequent processing. The choice of which of various processes to allocate to which framework service(s) 16 is controlled by the messaging service load balancing functionality already described.

Each framework service 16 may employ a message-driven constitution. That is, loading of business logic and execution of processing pursuant to such business logic may be triggered by the passing of message(s) from messaging service(s) 15.

In the present embodiment described above, because synchronous and asynchronous are available as possible ways of carrying out linking of framework service business logic and because business logic execution schedules(s) can be controlled simply and as needed by means of rewritable representation(s) in flow definition file(s), complicated business logic flow(s) can be defined and can moreover be easily changed as necessary.

Furthermore, in the present embodiment described above, the fact that messaging services may be connected in mesh fashion and the fact that keep-alive functionality may be employed permits mutual communication of status (message subject ID(s) awaited, whether engaged in ongoing process(es), etc.) between or among messaging services, between or among messaging service(s) and client(s), and/or between or among messaging service(s) and framework service(s). In addition, each messaging service may record in management table(s) the current status(es) of surrounding client(s), framework service(s), and/or other messaging service(s). Doing so will make it possible for each messaging service to automatically select message relay path(s) capable of being used normally and to deliver message(s) to correct system(s) despite any possible unavailability of RtFA server(s) due to crashes or the like. As a result, improved fault tolerance, improvements in system operational reliability, simpler system expansion, and simpler system maintenance are permitted.

Furthermore, messaging service(s) may be provided with a plurality of data distribution methods, such as P to P and/or P to M, and messaging schedule(s) specifying which message(s) should be sent to which computer system(s) by which data distribution method(s) may be automatically selected in correspondence to status(es) registered in management table(s). As a result, flexible messaging service(s) can be provided.

Furthermore, messaging service load balancing functionality makes it possible to automatically adjust balance in load between or among a plurality of RtFA servers, permitting provision of high performance.

Here, the scope of the present invention should not be limited to the present embodiment. It is for example possible to achieve an equivalent system through use of other than a JAVA-based platform. Furthermore, the features of the messaging service(s) described above and the features of the framework service(s) described above need not necessarily be combined as in the embodiment described above.

Below, some of the detailed functionality which the foregoing embodiment possesses will be described.

Figure 14:
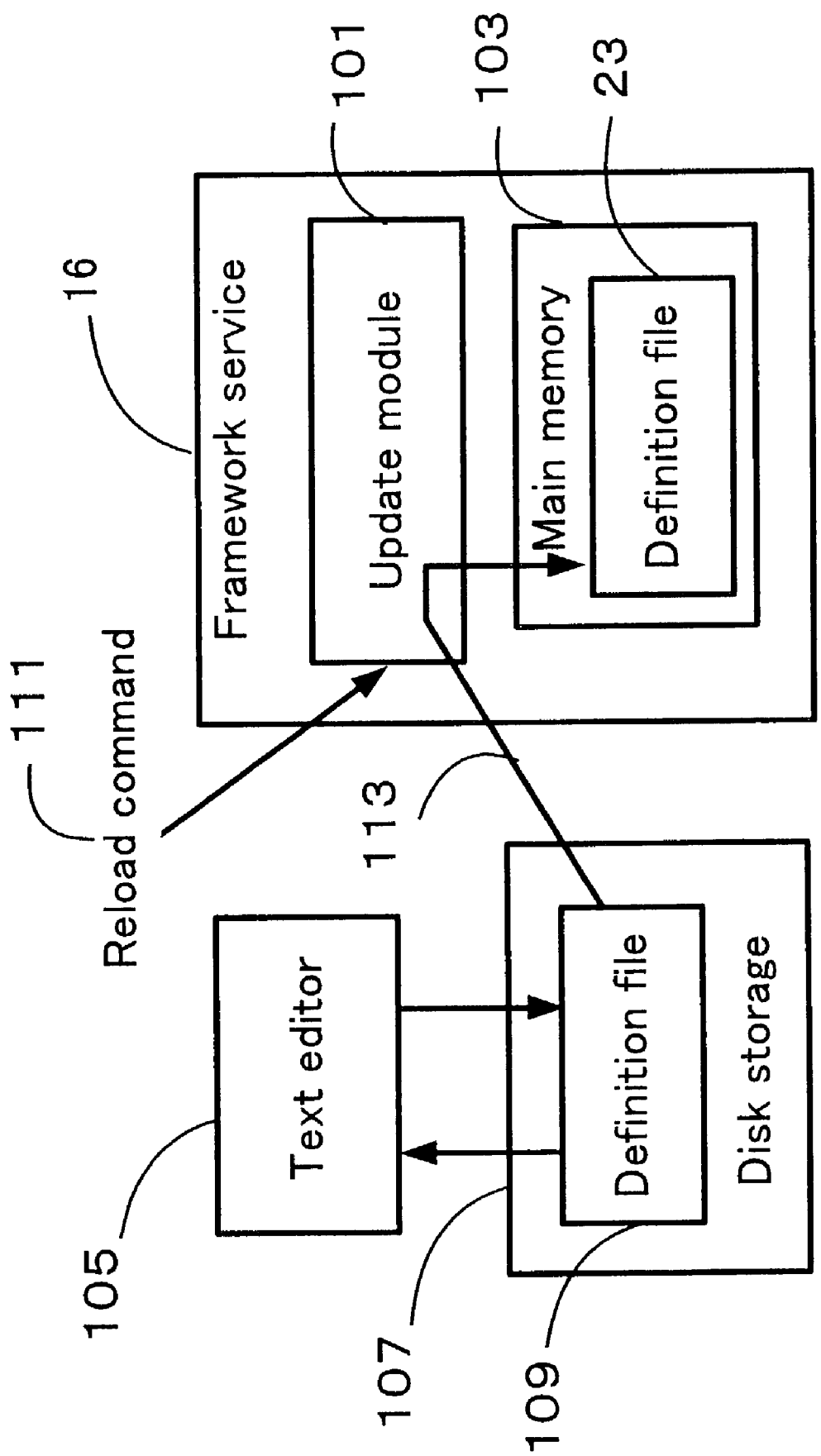
FIG. 14 is a block diagram showing a flow definition file update system.

FIG. 14 is a block diagram showing a system for updating flow definition file(s) 23.

Framework service(s) 16 may be provided with definition file update module(s) 101, being program module(s) for updating flow definition file(s) 23, and such update module(s) 101, upon receipt of reload command(s) 111 from the exterior, may carry out update by overwriting definition file(s) 23 currently in use and loaded within main memory or memories 103 of framework service(s) 16 with new definition file(s) 109 stored in external storage device(s) (e.g., disk storage 107) as indicated by arrow 113. New definition file(s) 109 within disk storage 107 may be easily edited using text editor(s) 105 or the like. By inputting the aforementioned reload command(s) 111 at desired time or times, definition file(s) 23 within main memory or memories 103 is or are updated to contain the same content as such edited new definition file(s) 109. This permits content of definition file(s) 23 to be rewritten at desired time or times notwithstanding the fact that framework service(s) 16 may be operational at such time(s), and permits operation of framework service(s) 16 to be made to thereafter reflect same. Accordingly, changes in scheduling of processing such as changes in what business logic 22 is to be executed and/or whether or not subsequent processing is to be performed, and/or whether linked operation of a plurality of sets of business logic is to be carried out synchronously or asynchronously, may be accomplished while the system is still operational.

Figure 15:
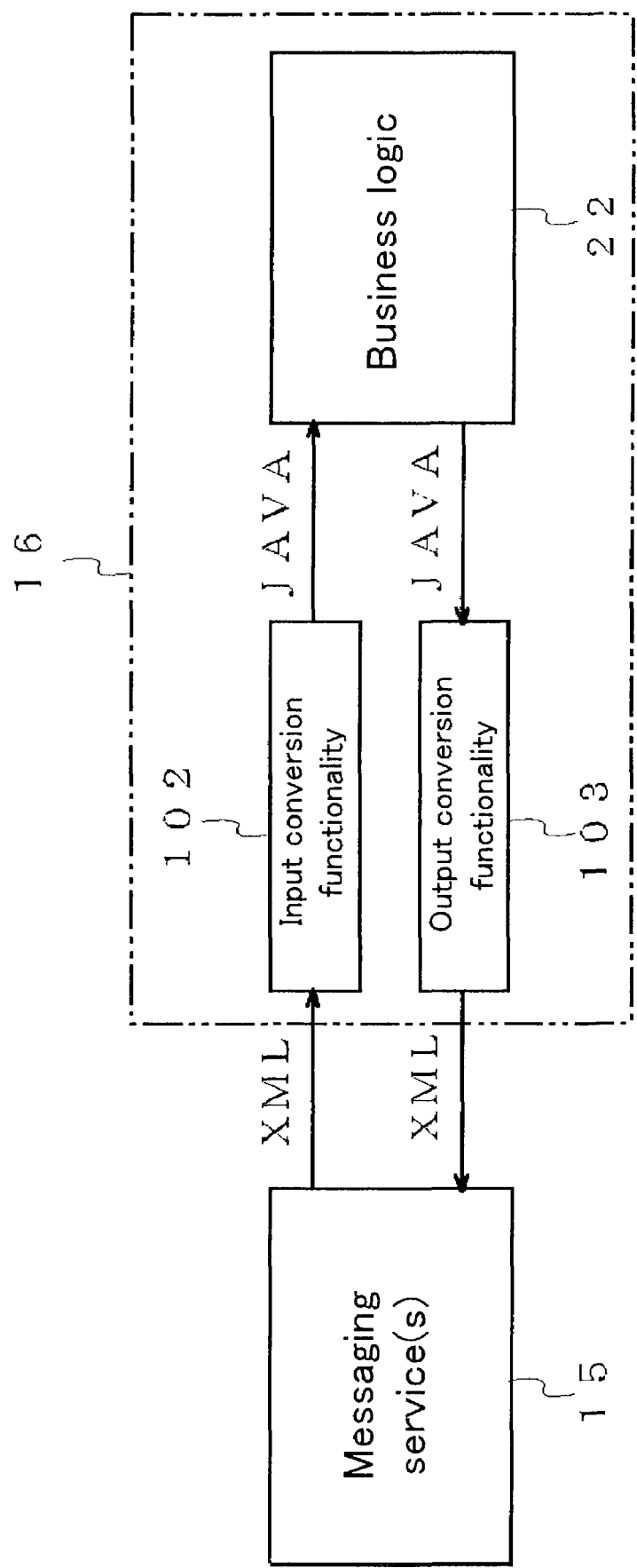
FIG. 15 is a block diagram showing framework service message conversion processing functionality.

FIG. 15 shows framework service message conversion processing functionality.

Computer program(s) for framework service(s) 16 may for example be constructed in the JAVA language. As shown in FIG. 15, framework service(s) 16 may be provided with input conversion functionality 102 for converting format of input message(s), and output conversion functionality 103 for converting format of output message(s). Input conversion functionality 102 might convert input message(s) in for example XML format from messaging service(s) 15 into JAVA object format. Output conversion functionality 103 might convert message(s) for output in JAVA object format to messaging service(s) 15 into XML format. Input conversion functionality 102 might acquire JAVA class member variable(s) based on representation(s) present in XML DTD(s) (Document Type Definition(s)) and might obtain JAVA object member(s) through instantiation thereof Furthermore, output conversion functionality 103 might form XML DTD(s) and obtain XML member(s) based on JAVA class member variable(s).

Figure 16:
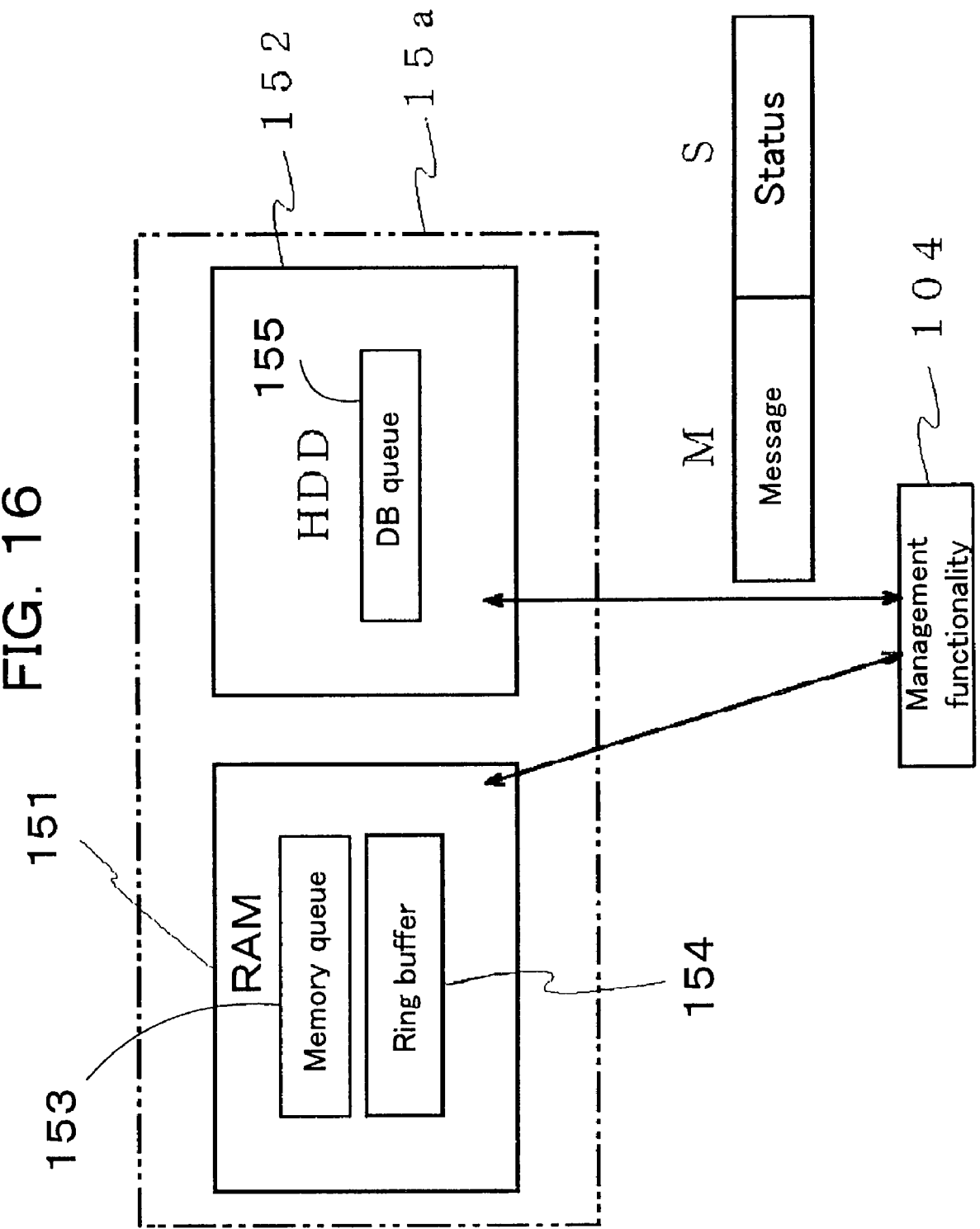
FIG. 16 is a block diagram showing messaging service message queue constitution.

FIG. 16 shows messaging service message queue constitution.

In the foregoing description, message queue(s) 15a might as easily have been unitary queue(s) as not. However, as shown in FIG. 16, message queue(s) 15a may actually comprise three types of queue(s); e.g., memory queue(s) 153, ring buffer(s) 154, and DB (database) queue(s) 155. Memory queue(s) 153 and/or ring buffer(s) 154 may be provided with RAM 151 or other such memory device(s) permitting high-speed access. DB queue(s) 155 may be provided with nonvolatile large-capacity storage device(s) such as hard disk drive(s) (HDD).

Memory queue(s) 153 may be used for temporarily delaying message(s) not requiring protected storage where component(s) exist to receive results of processing of such message(s), such as might be the case for P to P request message(s) received from client(s) by messaging service(s). On the other hand, DB queue(s) 155 may be used for temporarily delaying message(s) requiring protected storage, such as might be the case for request message(s) received from framework service(s) by messaging service(s) for the purpose of asynchronous subsequent processing. Whether protected storage of message(s) is required may be determined based on the "protected mode flag(s)" in the constitution of message 10 shown in FIG. 2.

Ring buffer(s) 154 may be used for temporarily delaying P to M message(s). Each computer system may, by cycling through ring buffer(s) 154, search for and acquire from ring buffer(s) 154 message(s) it awaits. While FIG. 16 illustrates only a single ring buffer 154, this may in fact represent a set of three ring buffers respectively corresponding to the three priority levels "H", "N", and "L".

DB queue(s) 155 may be used for temporarily delaying message(s) requiring protected storage, such as might be the case for request message(s) received from framework service(s) by messaging service(s) for the purpose of subsequent processing Messaging service(s) may have message queue management functionality 104 capable of controlling writing and reading of message(s) to and/or from the aforementioned queue(s) 153, 154, 155. Message queue management functionality 104 might give priority to memory queue(s) 153 relative to DB queue(s) 155, checking the former before the latter, and if P to P message(s) exists or exist at memory queue(s) 153, might retrieve such message(s) from memory queue(s) 153 and might send such message(s) to a computer system awaiting same. Furthermore, if there is not even one P to P message at memory queue(s) 153, message queue management functionality 104 might check DB queue(s) 155, and if P to P message(s) exists or exist within DB queue(s) 155, might read such message(s) from DB queue(s) 155 and might send same to a computer system awaiting same.

As shown in FIG. 16, message queue management functionality 104 might affix to message(s) M within DB queue(s) 155 status information S indicating processing status of such message(s), and if such message(s) have been processed might rewrite status information S from "unprocessed" to "processed". Furthermore, if error(s) resulted in connection with processing of such message(s), status information S might be set to "error". Causes of possible errors include data discrepancies, problems with program logic, and so forth. Once message(s) has or have been placed in DB queue(s) 155, such message(s) may be continued to be stored in DB queue(s) 155 without deletion despite occurrence of system crash, error, or other such problem.

Message queue management functionality 104 may be capable of rewriting status information S from "error" to "unprocessed". In addition, in the event of occurrence of system crash, error, or other such problem, message queue management functionality 104 might thereafter reread and resend message(s) for which status information S is "unprocessed". Doing so will ensure that such message(s) is or are definitely processed. Furthermore, tracking of status information S of message(s) associated with error(s) might permit causes of errors to be ascertained.

Furthermore, message queue management functionality 104 may be provided with ability to rewrite status information S from "error" to "processed" in correspondence to external command(s). For example, depending on system conditions, there may be circumstances where it is inappropriate to change message(s) from error status to unprocessed status and reoutput same. Furthermore, depending on the severity of the error, there might also be circumstances where it is more appropriate to correct such message(s) by means of command input rather than reoutput same to framework service(s) for processing. In such cases, such ability to rewrite status information S from "error" to "processed" might be employed. The foregoing ability to rewrite status information S from "error" to "unprocessed" or to "processed" may be selected freely.

Moreover, message queue management functionality 104 may possess read address pointer(s) for ring buffer(s) 154 for each of all of the respective computer system(s) registered in management table(s) 18 (FIG. 4), and might use such read address pointer(s) for each such computer system to cycle through ring buffer(s) 154, find in ring buffer(s) 154 P to M message(s) awaited by such computer system, and might read such found P to M message(s) therefrom and send same to such computer system.

Figure 17:
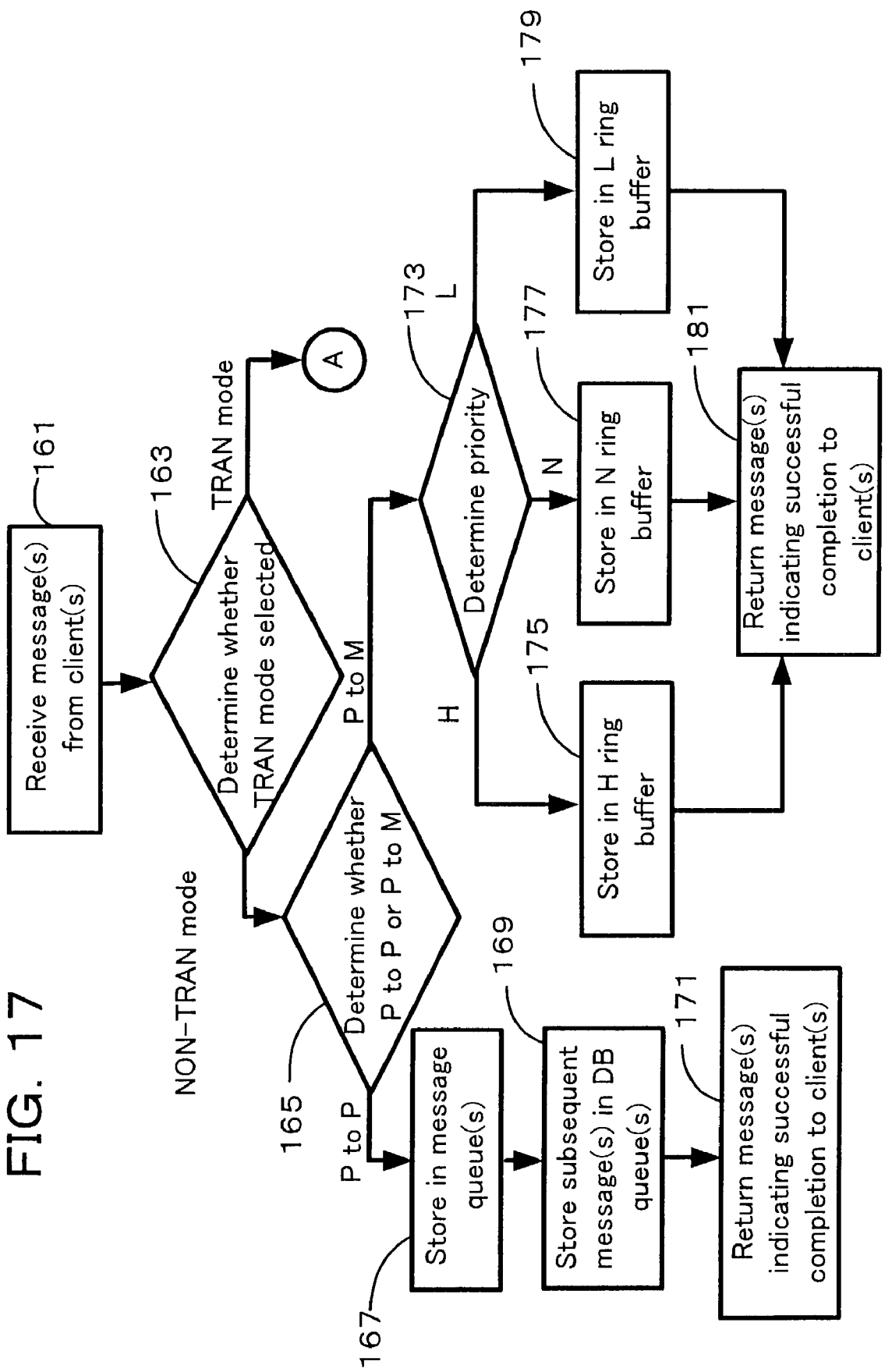
FIG. 17 is a flowchart showing operations by which message queue management functionality may store message(s) in message queue(s).
Figure 18:
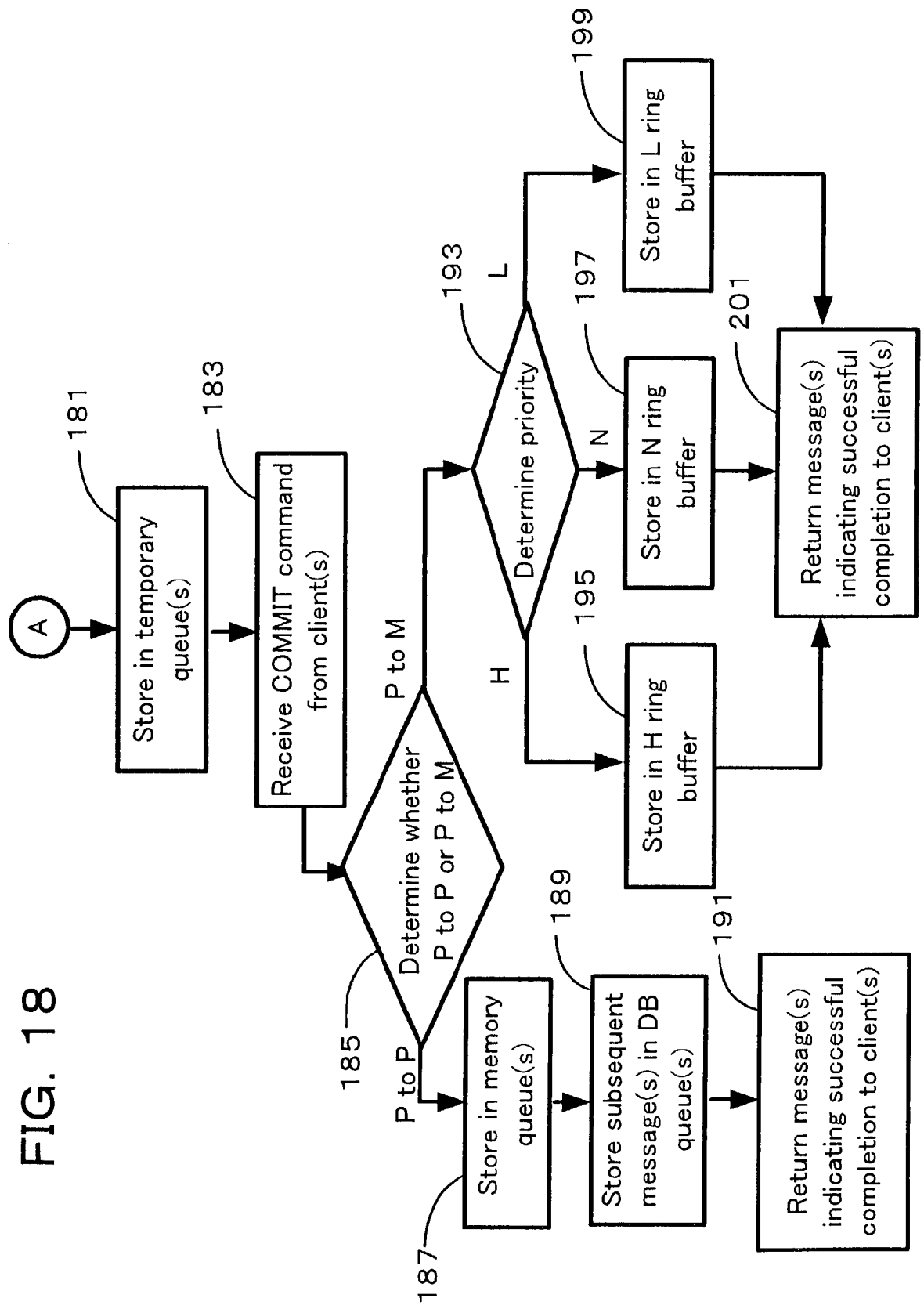
FIG. 18 is a continuation of the flowchart shown in FIG. 17.

FIGS. 17 and 18 are flowcharts showing operations by which message queue management functionality 104 might store message(s) in message queue(s).

As shown in FIG. 17, upon receipt of message(s) from client(s) (161), message queue management functionality 104 determines which of non-transaction mode (NON-TRAN mode) or transaction mode (TRAN mode) is specified by such client(s) for such message(s) (163). Here, if NON-TRAN mode is specified, message queue management functionality 104, immediately upon receipt of message(s), stores such message(s) in message queue(s) (i.e., processing of such message(s) is advanced). Conversely, if TRAN mode is specified, message queue management functionality 104, upon receipt of message(s), does not immediately store such message(s) in message queue(s) but instead places same in different temporary queue(s), and it is only when COMMIT (execute) command(s) is or are sent from client(s) that such message(s) is or are stored in message queue(s) (i.e., that processing of such message(s) is advanced). In the event that client(s) specifies or specify TRAN mode for issued request message(s), so long as COMMIT command(s) is or are not issued it will still be possible to thereafter revoke or modify such request message(s).

If as a result of step 163 in FIG. 17 it is determined that NON-TRAN mode is specified, message queue management functionality 104 determines whether such received message(s) is or are P to P or P to M (165). If as a result of such determination such message(s) is or are found to be P to P, message queue management functionality 104 places such received message(s) in queue(s) (167). Message(s) placed in queue(s) is or are immediately read and are sent to framework service(s), where it or they is or are processed. In the event that as a result of such processing request message(s) for subsequent processing is or are returned from framework service(s), message queue management functionality 104 places such request message(s) for subsequent processing in DB queue(s) (169). In addition, message queue management functionality 104 returns to client(s) successful completion message(s) indicating results of processing of such received message(s) (171).

If as a result of the determination at step 165 such message(s) is or are found to be P to M, message queue management functionality 104 determines whether the priority of such received message(s) (FIG. 2) is "H", "N", or "L" (173) and stores such received message(s) in ring buffer(s) corresponding to such determined priority (175, 177, and/or 179). P to M message(s) placed in ring buffer(s) is or are sent to all computer system(s) awaiting same. In addition, message queue management functionality 104 returns to client(s) successful completion message(s) for such received message(s) (181).

If it is determined at step 163 that TRAN mode is specified, processing proceeds to step 181 indicated in FIG. 18. At step 181, message queue management functionality 104 places such received message(s) in temporary queue(s) different from the foregoing message queue(s). Upon thereafter receiving COMMIT command(s) from client(s) for such received message(s), message queue management functionality 104 retrieves such message(s) from temporary queue(s), and such message(s) are subjected to the processing at step 185 and following steps. The processing at step 185 and following steps is identical to the processing at step 165 and following steps in FIG. 7 already described.

Figure 19:
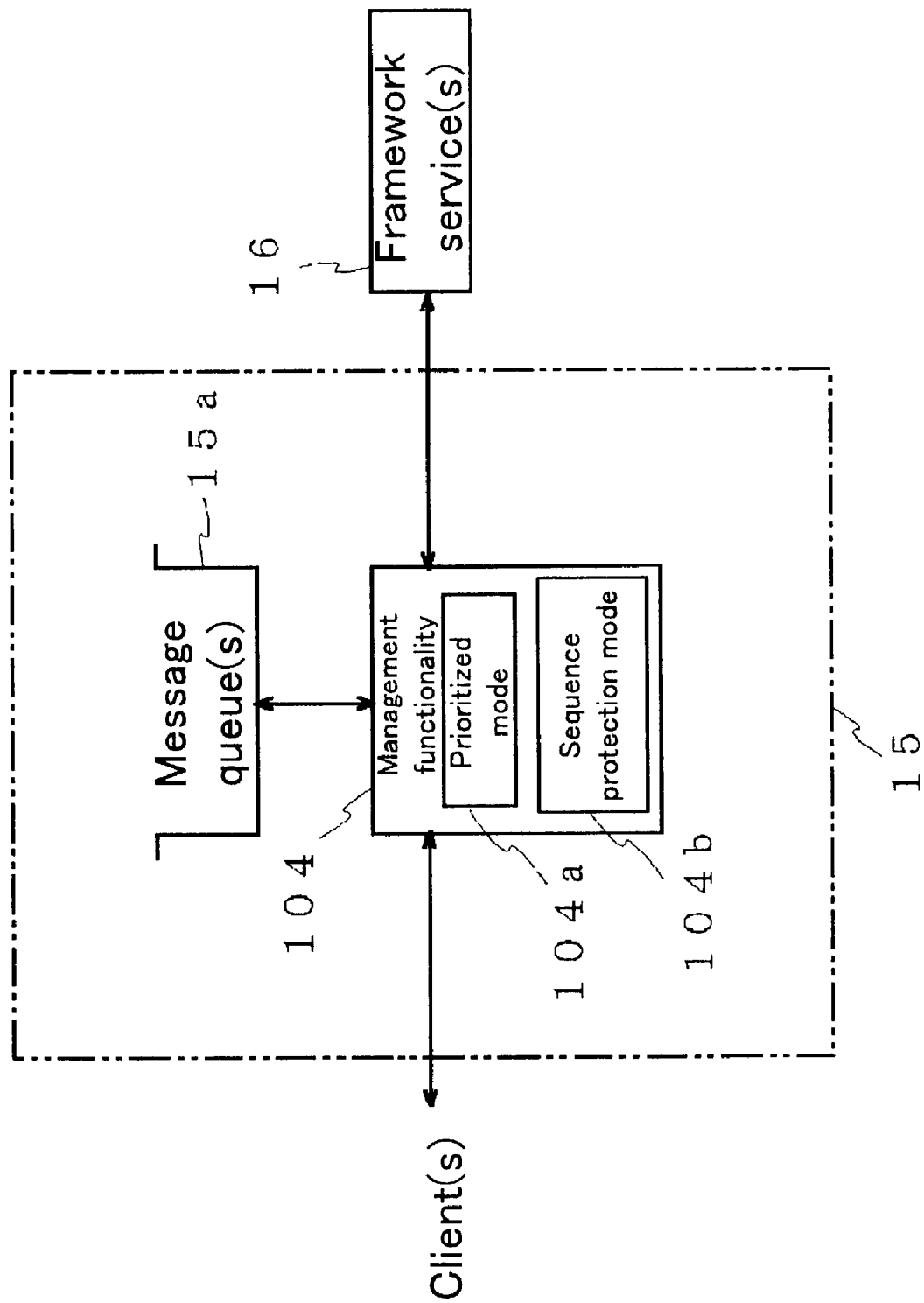
FIG. 19 is a block diagram showing a message read component of message queue management functionality.

FIG. 19 shows a message read functionality component of message queue management functionality 104.

As shown in FIG. 19, message queue management functionality 104 of messaging service(s) 15 may store message(s) respectively received from client(s) and framework service(s) in message queue(s) 15a having constitution(s) as described above. Particularly with respect to the way in which message(s) is or are retrieved from memory queue(s) 153 and/or DB queue(s) 155 of message queue(s) 15a shown in FIG. 16, message queue management functionality 104 may display the two functionalities represented by prioritized mode 104a and sequence protection mode 104b. Prioritized mode 104a is such that order(s) in which message(s) is or are retrieved from message queue(s) is or are controlled based on message priority or priorities. On the other hand, sequence protection mode 104b is such that prescribed order(s) of processing of a plurality of messages is or are protected by prohibiting retrieval of subsequent message(s) stored in message queue(s) until completion of processing by framework service(s) of message(s) previously retrieved from such message queue(s). Whether prioritized mode 104a is to be carried out or sequence protection mode 104b is to be carried out may be selected for each message queue in correspondence to respective message subject ID(s) and/or previously established mode setting(s) for respective message queue(s). Sequence protection mode 104b may be used for example where respective request messages for sales processing are coming from a plurality of clients, if it is desired to preserve prescribed processing order(s) of the sort such that sales processing request(s) coming later might be executed after completion of previous request(s) for sales processing.

Figure 20:
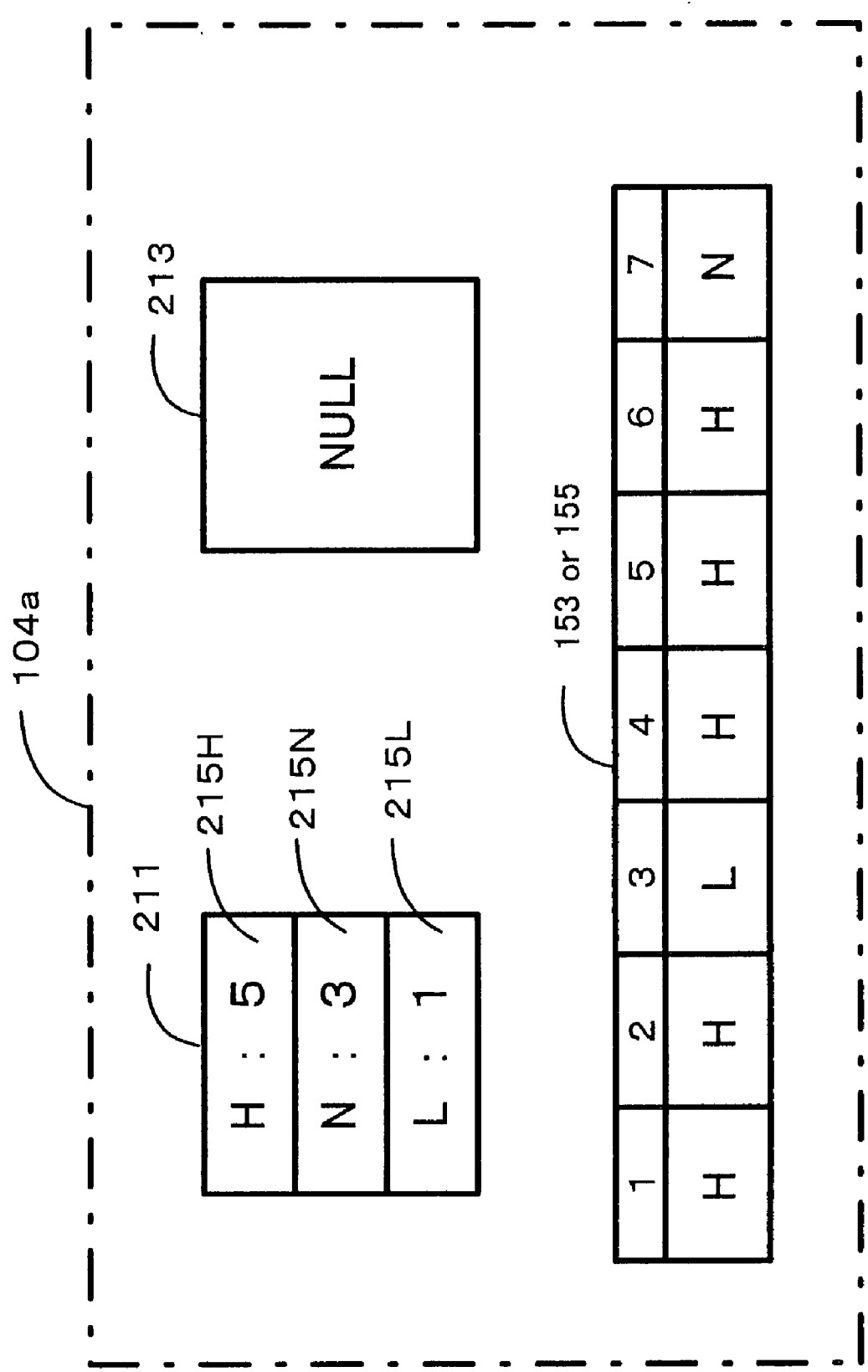
FIG. 20 shows constitution(s) of storage area(s) for prioritized mode.
Figure 21:
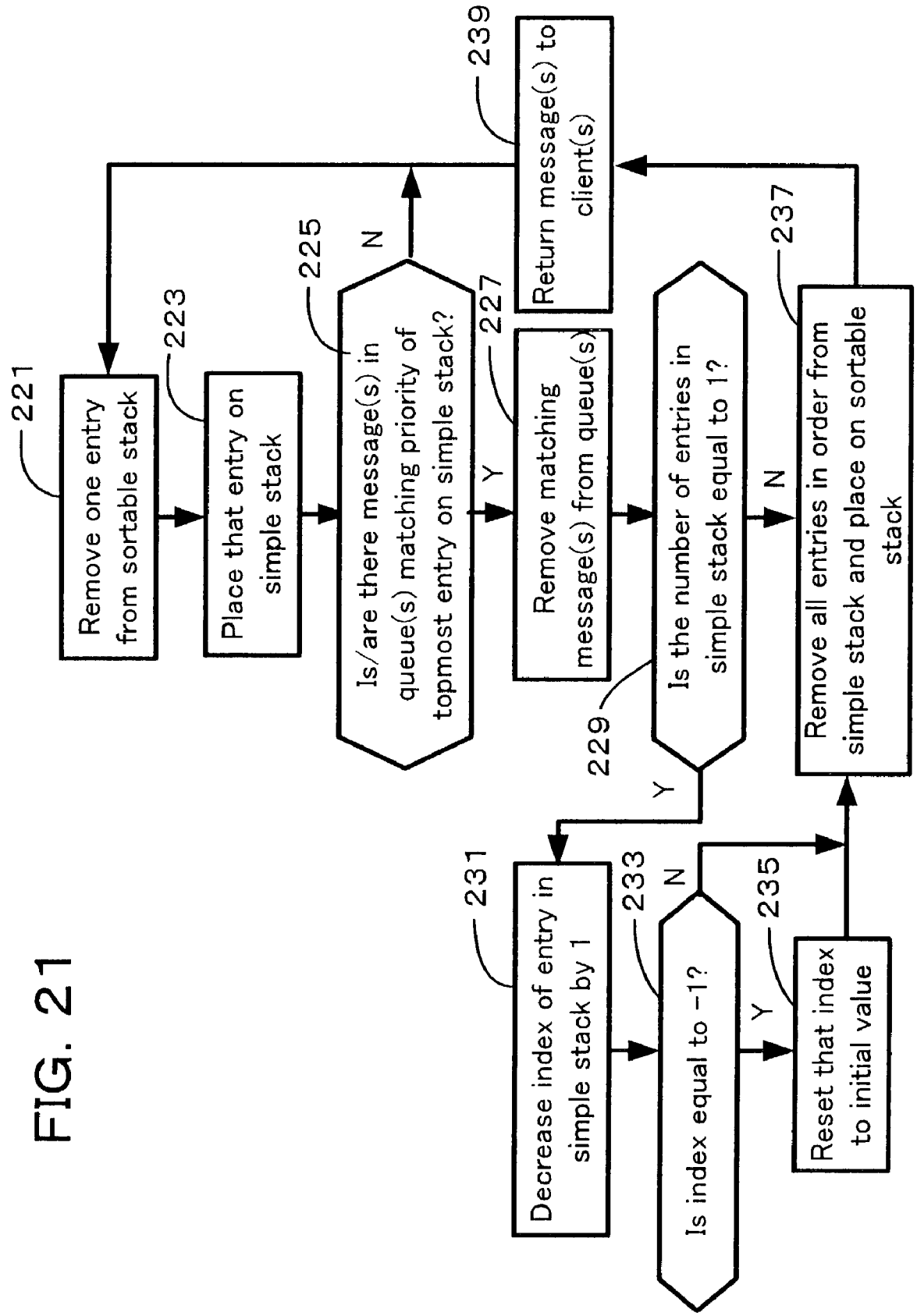
FIG. 21 shows flow of operations in prioritized mode.

FIG. 20 shows constitution(s) of storage area(s) for prioritized mode 104a. FIG. 21 shows flow of operations in prioritized mode 104a.

As indicated in FIG. 20, prioritized mode 104a might employ two stack memories represented by sortable stack 211 and simple stack 213, and for example three entries 215H, 215N, and 215L respectively corresponding to the three priority levels "H", "N", and "L". Note that it is also possible to have a greater number of entries. For example, in addition to the three entries shown in the drawing, another entry might be added which corresponds to "H".

Respective entries 215H, 215N, and 215L might initially be respectively set for example to index values such as the "5", "3", and "1" shown in the drawing. Initial index values might be such that the higher the value the higher the priority level which is indicated.

In addition, all of the entries 215H, 215N, and 215L might, as shown in the drawing, initially be present at sortable stack 211, with simple stack 213 being empty.

Sortable stack 211 might be such that the array represented by the plurality of indices present therein is automatically rearranged in order of increasing index so as to cause the entry with the highest index to be at the top and the entry with the lowest index to be at the bottom. Accordingly, entries may be removed from sortable stack 211 such that the higher the index of an entry the sooner it is removed therefrom.

Simple stack 213 might be such that entries placed therein later are just placed on top of entries previously placed therein. Accordingly, entries may be removed from simple stack 213 such that the later an entry was placed therein the sooner it will be removed therefrom.

In accordance with the flow of operations indicated in FIG. 21, prioritized mode 104a may control order(s) in which message(s) is or are removed from message queue(s) (memory queue(s) 153 and/or DB queue(s) 155) through movement of entries between sortable stack 211 and simple stack 213, and manipulation of indices of entries.

Below, the flow of operations indicated in FIG. 21 will be described. First, prioritized mode 104a removes the topmost entry (i.e., the entry having the highest index) from sortable stack 211 (221) and places that entry in simple stack 213 (223). Next, prioritized mode 104a checks to see whether message queue(s) contains or contain message(s) having priority or priorities matching the priority of the topmost entry in simple stack 213 (225). If the result is that there is or are no matching message(s), processing proceeds to step 221. Furthermore, if as a result of the foregoing check matching message(s) is or are found, then prioritized mode 104a removes such matching message(s) from such message queue(s) (227). Message(s) removed therefrom are processed at some framework service(s). Prioritized mode 104a then checks to see whether the number of entries present at simple stack 213 is one (229). If it is as a result found that the number of entries at simple stack 213 is two or greater, then all entries are removed in order from simple stack 213 and are placed on sortable stack 211 (237). In addition, for message(s) removed from message queue(s) at step 227, prioritized mode 104a returns to client(s) reply message(s) indicating processing results from framework service(s) (239).

If as a result of the check at step 229 it is found that the number of entries at simple stack 213 is one, then prioritized mode 104a decreases by 1 the index of the entry in simple stack 213 (231). In addition, prioritized mode 104a checks to see whether the index after being so decreased is "−1" (233), and if it is not "−1" then processing proceeds to step 237, but if it is "−1" then that index is reset to its initial value (235) and processing thereafter proceeds to step 237.

The foregoing operations permit message(s) to be retrieved from message queue(s) in an order such that the order in which messages are stacked within message queue(s) is corrected to reflect priority or priorities of messages. That is, if the order, in terms of priorities, of messages present within a message queue is, for example as indicated at FIG. 20, "H", "H", "L", "H", "H", "H", "N", the order in which those messages are retrieved from that message queue might, in terms of priorities, be "H", "H", "N", "H", "H", "H", "L".

Figure 22:
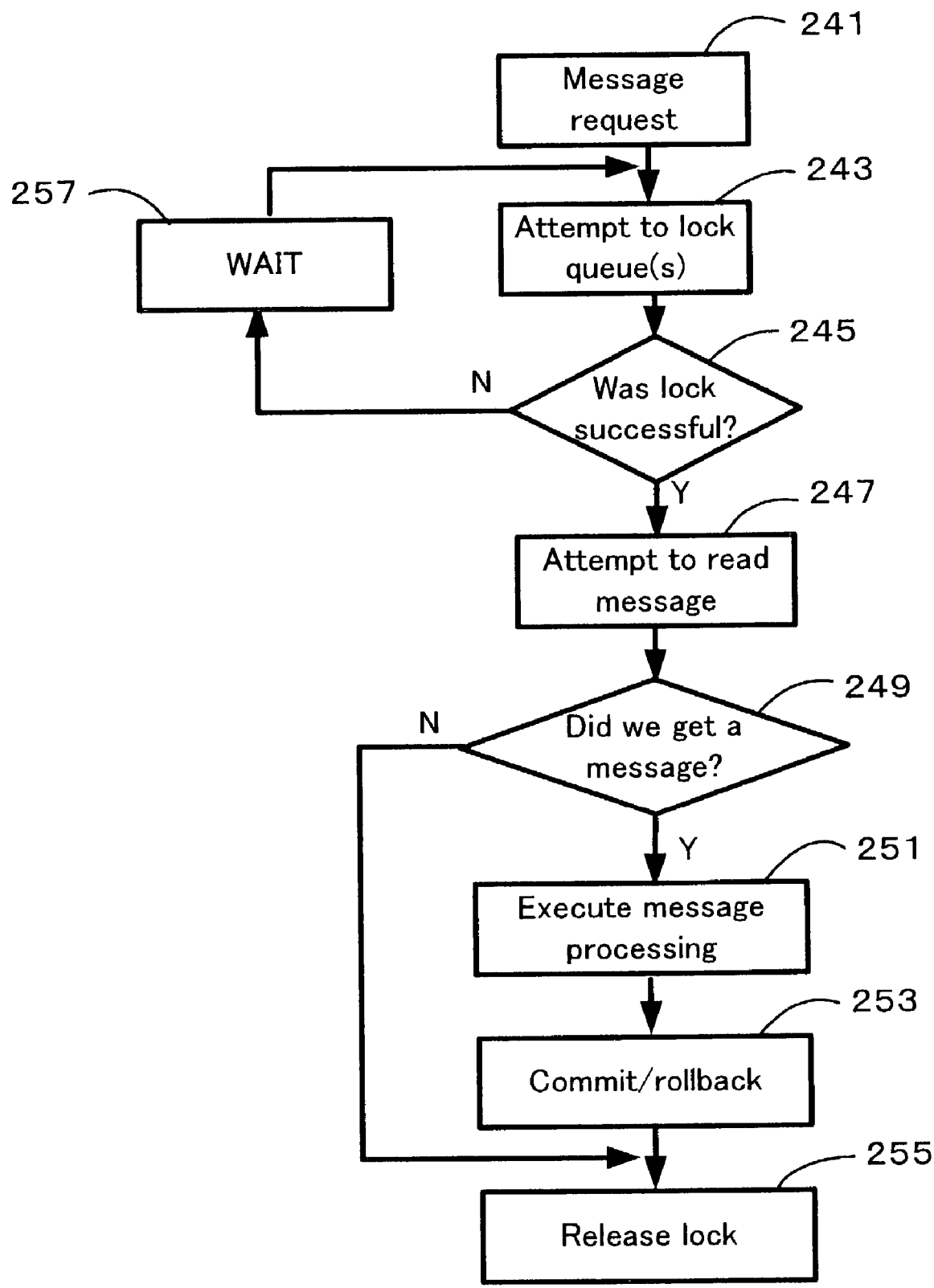
FIG. 22 shows flow of operations in sequence protection mode.

FIG. 22 shows flow of operations in sequence protection mode 104b.

As shown in FIG. 22, sequence protection mode 104b is such that upon issuance of a message retrieval request (241), message queue(s) is or are first locked (243, 245, 257), prohibiting retrieval of other message(s) from message queue(s). Next, sequence protection mode 104b reads one message from a message queue (247, 249). The message so read is processed at some framework service(s) (251), and commit (or rollback if processing does not complete successfully) operation(s) pursuant to any database update(s) appropriate to such processing is or are carried out (253). Sequence protection mode 104b thereafter releases the lock on message queue(s) (255).

The foregoing operations permit a prescribed order of processing of messages to be preserved due to the fact that processing of a next message is executed after completion of processing of a previous message.

Figure 23:
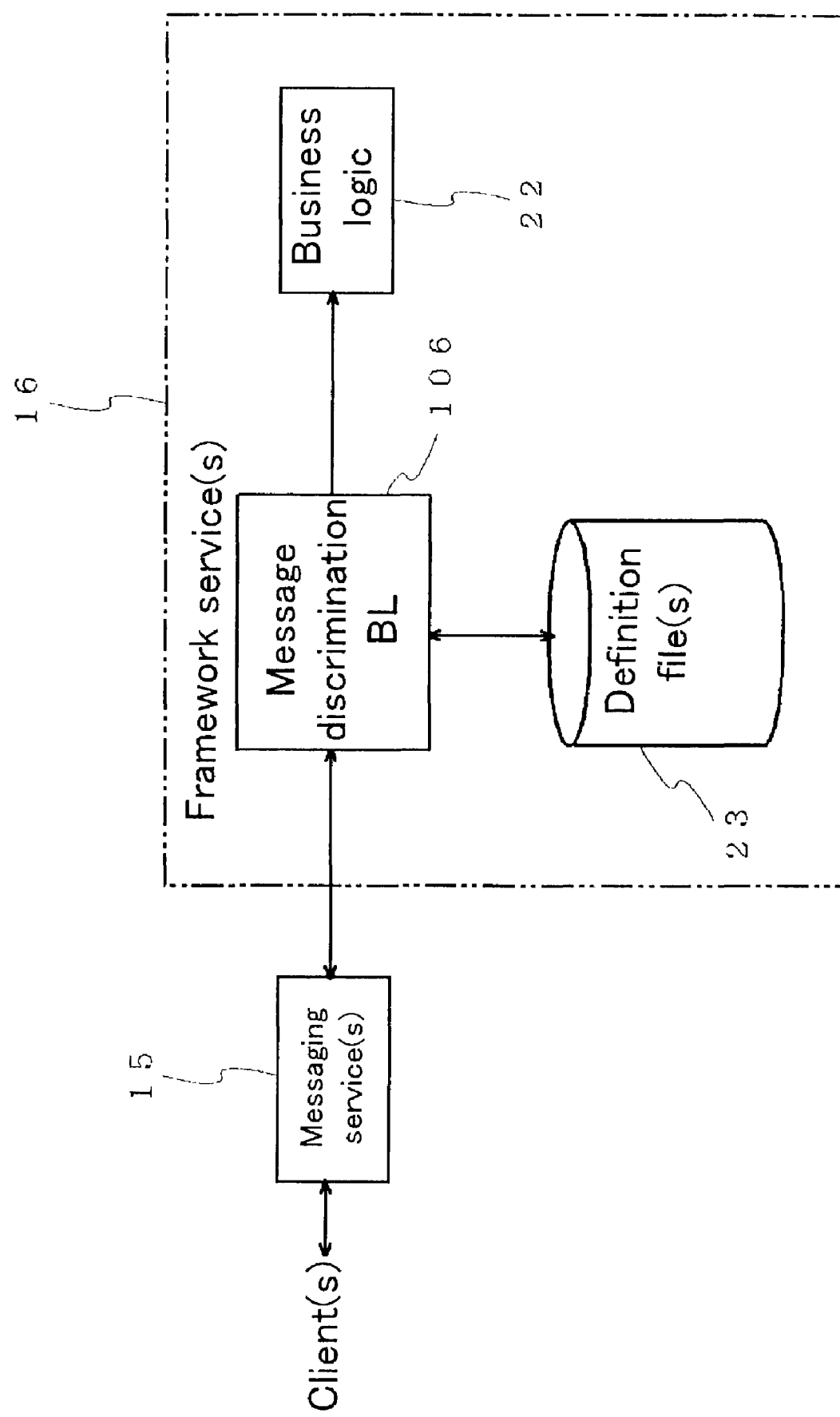
FIG. 23 is a block diagram showing framework service message discrimination functionality.

FIG. 23 shows message discrimination functionality at a framework service 16.

As shown in FIG. 23, framework service(s) 16 may possess message discrimination business logic 106, message discrimination business logic 106 being executed upon receipt of message(s) from messaging service(s) 15. Message discrimination business logic 106 might search flow definition file(s) 23 associated with such framework service(s) for definition sentence(s) containing subject ID(s) matching subject ID(s) of such received message(s). If matching definition sentence(s) is or are found, executable business logic 22 indicated by such definition sentence(s) might then be executed. However, if no matching definition sentence is found, message discrimination business logic 106 might return to messaging service(s) 15 reply message(s) indicating error(s) to the effect that processing could not be performed, and such reply message(s) might be sent to client(s). As has already been described, because messaging service(s) 15 only sends respective message(s) to computer system(s) awaiting such message(s) based on management table(s) 18 (FIG. 4), as a general principle there should be no situation where a particular message is mistakenly sent to a wrong framework service. However, even in the unlikely event that a particular message from client(s) is mistakenly sent to wrong framework service(s), because such client(s) would immediately receive reply message(s) indicating error(s) to the effect that processing could not be performed there would be no extended delay and processing could quickly proceed to the next operation.

Furthermore, framework service(s) 16 may be provided with a service unavailable mode capable of granting permission for processing by framework service(s) only to message(s) having previously registered identification information, in which case if such mode was selected then upon receipt from client(s) of message(s) having identification information which is not previously registered, message(s) might be returned to client(s) to the effect that such message(s) will not be accepted.

Figure 24:
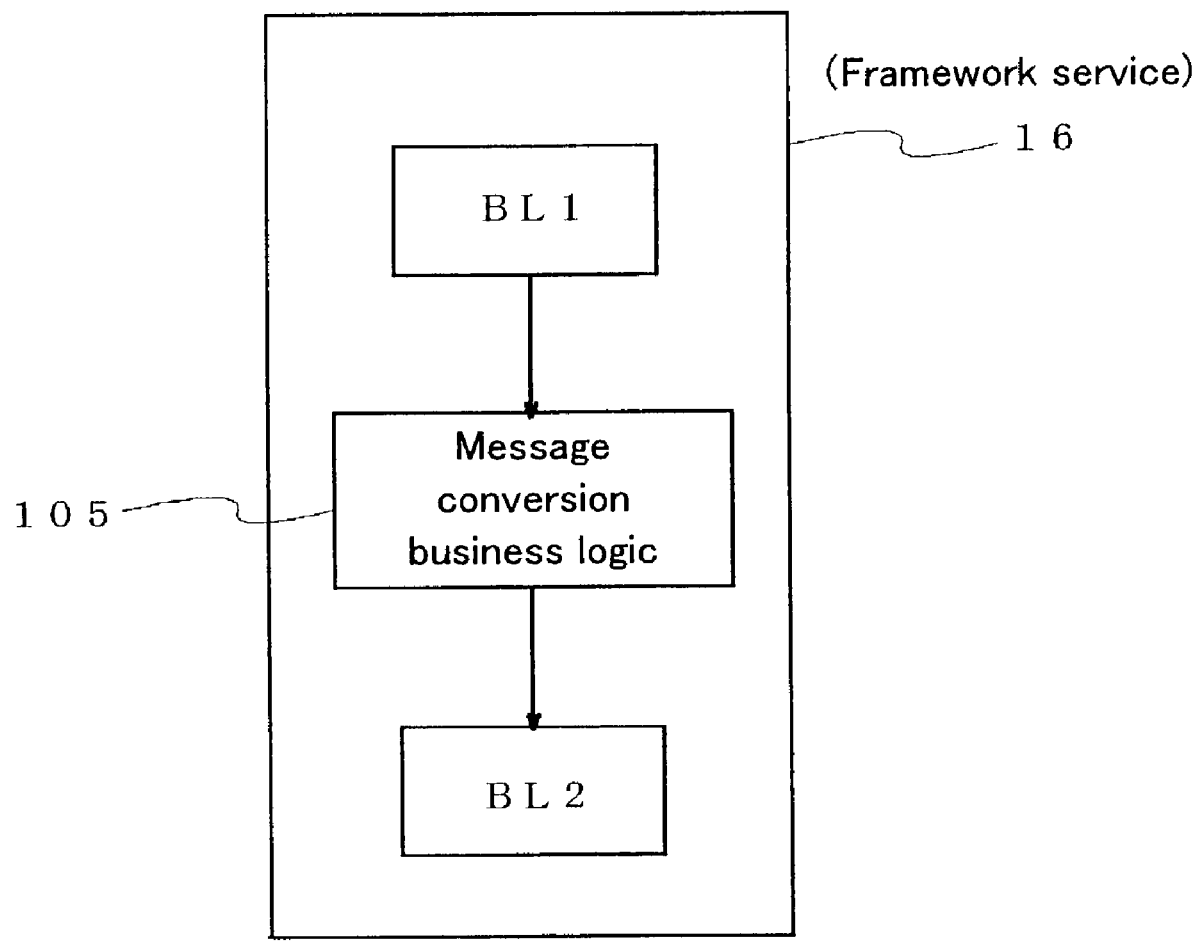
FIG. 24 is a block diagram showing business logic for framework service message conversion.

FIG. 24 shows message conversion business logic possessed by framework service(s).

As shown in FIG. 24, framework service(s) 16 may have one or more sets of message conversion business logic 105. Such set(s) of message conversion business logic 105 might for example be the "CnvBuyUpdBuy", "CnvBuyInsBuy1", and/or "CnvBuyInsBuy2" indicated at definition sentences 233 and 234 of flow definition file 23 shown in FIG. 13 or the like. Each set of message conversion business logic 105 might correspond to one previously established set of business logic BL1. Upon execution of a particular set of business logic BL1 in accordance with a particular definition sentence, message conversion business logic 105 corresponding thereto might be executed following same. Message conversion business logic 105 may be provided with format conversion functionality such that format(s) for processing results message(s) output from first business logic BL1 is or are made to conform to format(s) for message(s) input to subsequent business logic BL2, and message filtering functionality such that whether message(s) output from first business logic BL1 is or are to be input to subsequent business logic BL2 is determined in correspondence to parameter(s) associated with such message(s). For example, if a configuration of parameters for messages handled by first business logic BL1 is different from a configuration of parameters for messages handled by subsequent business logic BL2, message conversion business logic 105 might convert the former configuration of parameters to the latter configuration of parameters. Furthermore, there are situations (e.g., denial of request, unsuccessful attempt to update database, rollback of transaction, etc.) where the special nature of a message output from first business logic BL1 would cause execution of subsequent business logic BL2 to be meaningless. In such a case, message conversion business logic 105 might by virtue of its message filtering functionality omit creation of message(s) for input to subsequent business logic BL2. Here, message queue(s) capable of temporarily holding message(s) may be interposed between first business logic BL1 and message conversion business logic 105, and/or between message conversion business logic 105 and subsequent business logic BL2.

The foregoing descriptions are merely illustrative examples for purposes of describing the present invention. The present invention is not limited to the foregoing embodiments, but may also be carried out in the context of a great many other variations on system configuration.

The invention claimed is:

1. A framework system connected so as to be capable of communication with one or more clients, said system comprising: a plurality of sets of business logic; one or more framework services, one or more of which is or are associated with at least one of the sets of business logic and which, responsive to one or more request messages from at least one of the client or clients, is or are capable of executing one or more selected sets among the sets of business logic and outputting one or more reply messages to at least one of the client or clients; one or more messaging services interposed between one or more of the client or clients and one or more of the framework service or services and capable of relaying one or more messages between the client or clients and the framework service or services; and one or more flow definition files associated with one or more of the framework service or services; at least one of the request message or messages comprising at least one subject ID identifying at least one subject of at least one of the request message or messages; at least one of the flow definition file or files comprising a plurality of definition sentences respectively corresponding to a plurality of different subject IDs, each such definition sentence indicating one or more schedules for execution of one or more prescribed sets of business logic; and at least one of the framework service or services, upon receipt of at least one of the request message or messages from the messaging service or services, referencing at least one definition sentence present within at least one of the definition file or files and corresponding to at least one subject ID of at least one of the request message or messages, and selecting at least one set of business logic for execution in accordance with at least one execution schedule indicated by at least one of the referenced definition sentence or sentences; wherein at least one definition sentence present within at least one of the flow definition file or files indicates at least one linked execution schedule for linked execution of a plurality of sets of business logic comprising one set of first business logic and at least one set of subsequent business logic; at least one of the linked execution schedule or schedules comprising indication of the state or states of one or more linking mode flags for selection of synchronous or asynchronous execution of at least one of the set or sets of subsequent business logic; at least one of the framework service or services, in the event of execution of the plurality of sets of business logic in accordance with at least one of the linked execution schedule or schedules, executing at least one of the set or sets of subsequent business logic synchronously or asynchronously with respect to execution of the set of first business logic in accordance with at least one of the linking mode flag or flags present within at least one of the linked execution schedule or schedules.

2. A framework system according to claim 1 further comprising one or more flow definition update components capable of updating at least one of the flow definition file or files while at least one of the framework service or services is operational.

3. A framework system according to claim 1 wherein
at least one of the linked execution schedule or schedules comprises information concerning the set of first business logic and information concerning one or more secondary request messages for at least one of the set or sets of subsequent business logic;
the framework system, in the event of execution of the plurality of sets of business logic in accordance with at least one of the linked execution schedule or schedules, executing the set of first business logic, thereafter using the results of execution of the set of first business logic to create at least one of the secondary request message or messages, sending at least one of the secondary request message or messages to at least one of the messaging service or services, and thereafter, upon receipt of at least one of the secondary request message or messages from at least one of the messaging service or services, executing at least one of the set or sets of subsequent business logic in accordance with at least one execution schedule of at least one definition sentence corresponding to at least one of the secondary request message or messages.

4. A framework system according to claim 3 wherein
at least one of the messaging service or services is equipped with one or more nonvolatile message queues capable of protected storage of at least one of the secondary request message or messages;
at least one of the message queue or queues being capable of preventing deletion of at least one of the secondary request message or messages by continuing to store at least one of the secondary request message or messages after one or more of the secondary request message or messages has or have been sent to one or more of the framework service or services.

5. A framework system according to claim 4 wherein
at least one of the messaging service or services is capable of resending at least one of the secondary request message or messages stored in at least one of the message queue or queues to the framework system as necessary.

6. A framework system connected so as to be capable of communication with one or more clients, said system comprising: a plurality of messaging services mutually connected in mesh fashion and comprising at least one messaging service which is connected to at least one of the one or more clients; and a plurality of framework services respectively connected to the plurality of messaging services; the plurality of framework services respectively being capable of awaiting one or more request messages having one or more preestablished subject IDs and\upon receipt of at least one of the request message or messages having preestablished subject ID or IDs, of processing the received request message or messages and of outputting one or more reply messages to at least one of the client or clients; and the plurality of messaging services being capable of relaying one or more messages between the client or clients and the plurality of framework services and being capable of relaying one or more messages between or among the plurality of framework systems; wherein at least one of the messaging services has its own respective management table; one or more subject IDs of one or more messages awaited by one or more of the framework systems connected to the messaging services and one or more subject IDs of one or more messages respectively awaited by one or more messaging services other than the at least one messaging service but connected to the at least one messaging service being registered in at least one of the management table or tables respective to the messaging service or services; and the at least one messaging service, at one or more times when at least one message is received, referencing at least one of the management table or tables respective thereto, searching for one or more of the framework services or one or more of the other messaging services that awaits or await at least one subject ID matching at least one subject ID of the at least one received message, and relaying the at least one received message to at least one of the framework service or services or other messaging service or services found as a result of the search.

7. A framework system according to claim 6 wherein the messaging services are respectively capable of monitoring operation of one or more other messaging services; and, in the event that normal operation of at least one other messaging service fails to be detected, one or more messages is or are relayed to one or more normally operating other messaging services instead of to the at least one other messaging service.

8. A framework system according to claim 6 wherein the messaging services are respectively capable of monitoring state or states of one or more of the framework services respectively connected to the messaging services; and selection of whether to relay at least one of the request message or messages from at least one of the client or clients to at least one of the respective framework services connected to the respective messaging services or to one or more other messaging services is made in correspondence to the monitored state or states.

9. A framework system according to claim 6 wherein at least one of the messaging services communicates, to one or more messaging services other than the at least one messaging service but connected to the at least one messaging service, at least one subject ID of at least one message awaited by the at least one messaging service based on content of at least one of the management table or tables respective to the messaging service or services.

10. A framework system according to claim 9 wherein at least one of the messaging services, upon receipt of communication, from one or more respective messaging services other than the at least one messaging service but connected to the at least one messaging service, of at least one subject ID of at least one message awaited by one or more of the other messaging services, additionally registers the communicated content in at least one of the management table or tables respective to the messaging service or services if the communicated content is not yet registered in one or more of the management table or tables respective thereto.

11. A framework system connected so as to be capable of communication with one or more clients, said system comprising: one or more framework services, one or more of which is or are capable of processing one or more request messages from at least one of the client or clients and of outputting one or more reply messages to at least one of the client or clients; and one or more messaging services interposed between one or more of the client or clients and one or more of the framework service or services and capable of relaying one or more messages between the client or clients and the framework service or services; the request message or messages being prioritized in a particular fashion; at least one of the messaging service or services comprising one or more message queues capable of temporarily delaying at least one of the request message or messages and one or more queue management components capable of managing input and/or output of at least one of the message queue or queues; and at least one of the queue management component or components being provided with a prioritized mode by which, at one or more times when a plurality of messages have been stored in one or more of the message queue or queues, the order or orders in which the plurality of messages are output from the message queue or queues is or are controlled in correspondence to the respective priority or priorities of the respective message or messages, and with a sequence protection mode by which, at one or more times when a plurality of messages have been stored in one or more of the message queue or queues, retrieval of one or more other messages stored in the message queue or queues is prohibited until completion of processing at one or more of the framework service or services of at least one message previously retrieved from the message queue or queues; wherein at least one definition sentence present within at least one of the flow definition file or files indicates at least one linked execution schedule for linked execution of a plurality of sets of business logic comprising one set of first business logic and at least one set of subsequent business logic; at least one of the linked execution schedule or schedules comprising indication of the state or states of one or more linking mode flags for selection of synchronous or asynchronous execution of at least one of the set or sets of subsequent business logic; at least one of the framework service or services, in the event of execution of the plurality of sets of business logic in accordance with at least one of the linked execution schedule or schedules, executing at least one of the set or sets of subsequent business logic synchronously or asynchronously with respect to execution of the set of first business logic in accordance with at least one of the linking mode flag or flags present within at least one of the linked execution schedule or schedules.

12. A method of operating a framework system connected so as to be capable of communication with one or more clients, said method comprising: a step wherein at least one request message is received from at least one of the client or clients; a step wherein at least one of the received request message or messages is placed in one or more message queues; a step wherein at least one request message is retrieved from at least one of the message queue or queues; and a step wherein at least one retrieved request message is processed; the retrieval step employing a prioritized mode by which, at one or more times when a plurality of messages have been stored in one or more of the message queue or queues, the order or orders in which the plurality of messages are output from the message queue or queues is or are controlled in correspondence to priority or priorities of respective messages, and employing a sequence protection mode by which, at one or more times when a plurality of messages have been stored in one or more of the message queue or queues, retrieval of one or more other messages stored in the message queue or queues is prohibited until completion of processing of at least one message previously retrieved from the message queue or queues; wherein at least one definition sentence present within at least one of the flow definition file or files indicates at least one linked execution schedule for linked execution of a plurality of sets of business logic comprising one set of first business logic and at least one set of subsequent business logic; at least one of the linked execution schedule or schedules comprising indication of the state or states of one or more linking mode flags for selection of synchronous or asynchronous execution of at least one of the set or sets of subsequent business logic; at least one of the framework service or services, in the event of execution of the plurality of sets of business logic in accordance with at least one of the linked execution schedule or schedules, executing at least one of the set or sets of subsequent business logic synchronously or asynchronously with respect to execution of the set of first business logic in accordance with at least one of the linking mode flag or flags present within at least one of the linked execution schedule or schedules.

* * * * *